(12) United States Patent
Shimokawa et al.

(10) Patent No.: US 11,552,515 B2
(45) Date of Patent: Jan. 10, 2023

(54) ROTOR, MOTOR, FAN, AND AIR CONDITIONER

(71) Applicant: Mitsubishi Electric Corporation, Tokyo (JP)

(72) Inventors: Takaya Shimokawa, Tokyo (JP); Hiroki Aso, Tokyo (JP); Ryogo Takahashi, Tokyo (JP); Kazuma Nomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 101 days.

(21) Appl. No.: 17/056,852

(22) PCT Filed: Jun. 25, 2018

(86) PCT No.: PCT/JP2018/023964
§ 371 (c)(1),
(2) Date: Nov. 19, 2020

(87) PCT Pub. No.: WO2020/003341
PCT Pub. Date: Jan. 2, 2020

(65) Prior Publication Data
US 2021/0234420 A1 Jul. 29, 2021

(51) Int. Cl.
*H02K 1/276* (2022.01)
*H02K 21/16* (2006.01)
(Continued)

(52) U.S. Cl.
CPC .......... *H02K 1/2766* (2013.01); *H02K 21/16* (2013.01); *F24F 2013/1433* (2013.01); *H02K 29/03* (2013.01); *H02K 2213/03* (2013.01)

(58) Field of Classification Search
CPC .... H02K 1/276; H02K 1/2766; H02K 1/2746; H02K 2213/03; H02K 21/16; H02K 29/03
See application file for complete search history.

(56) References Cited

U.S. PATENT DOCUMENTS

| 2004/0007930 A1 | 1/2004 | Asai et al. |
| 2010/0308680 A1 | 12/2010 | Yamada et al. |

(Continued)

FOREIGN PATENT DOCUMENTS

| CN | 107124054 A | 9/2017 |
| JP | 2003-309953 A | 10/2003 |

(Continued)

OTHER PUBLICATIONS

Machine Translation of JP 2003309953 A (Year: 2003).*

(Continued)

*Primary Examiner* — Quyen P Leung
*Assistant Examiner* — Christopher S Leone
(74) *Attorney, Agent, or Firm* — Posz Law Group, PLC

(57) ABSTRACT

A rotor includes a rotor core. A permanent magnet constitutes a first magnetic pole, and a part of the rotor core constitutes a second magnetic pole. In the second magnetic pole, a plurality of slits is symmetrically formed with respect to a magnetic pole center line connecting a pole center of the second magnetic pole and the center axis. On one side of the magnetic pole center line in a circumferential direction about the center axis, the plurality of slits has a first slit closest to the magnetic pole center line and a second slit adjacent to the first slit in the circumferential direction. A minimum distance L1 from the first slit to the outer circumference of the rotor core and a minimum distance L2 from the second slit to the outer circumference of the rotor core satisfy L1<L2.

12 Claims, 10 Drawing Sheets

(51) Int. Cl.
*F24F 13/14* (2006.01)
*H02K 29/03* (2006.01)

(56) References Cited

U.S. PATENT DOCUMENTS

| | | | |
|---|---|---|---|
| 2012/0112588 A1* | 5/2012 | Watanabe | H02K 11/40 |
| | | | 310/90 |
| 2014/0191628 A1* | 7/2014 | Nakano | H02K 1/276 |
| | | | 310/68 B |
| 2016/0181877 A1 | 6/2016 | Ishikawa et al. | |
| 2016/0211709 A1 | 7/2016 | Tsuchida et al. | |
| 2017/0117762 A1* | 4/2017 | Takahata | F04C 18/0215 |
| 2018/0219438 A1 | 8/2018 | Oikawa et al. | |
| 2020/0309437 A1* | 10/2020 | Kumakura | H02K 1/27 |

FOREIGN PATENT DOCUMENTS

| | | | | |
|---|---|---|---|---|
| JP | 2003309953 A | * | 10/2003 | |
| JP | 2004-346757 A | | 12/2004 | |
| JP | 2008-167583 A | | 7/2008 | |
| JP | 2008167583 A | * | 7/2008 | |
| JP | 2010-273442 A | | 12/2010 | |
| JP | 2011-083168 A | | 4/2011 | |
| JP | 2011-103759 A | | 5/2011 | |
| JP | 2012-244783 A | | 12/2012 | |
| JP | 2013-165611 A | | 8/2013 | |
| KR | 10-2012-0007940 A | | 1/2012 | |
| WO | 2013/094349 A1 | | 6/2013 | |
| WO | WO-2013094349 A1 | * | 6/2013 | H02K 1/276 |
| WO | 2015/045027 A | | 4/2015 | |
| WO | 2015/045999 A | | 4/2015 | |
| WO | 2017/085814 A1 | | 5/2017 | |

OTHER PUBLICATIONS

Machine Translation of WO 2013094349 A1 (Year: 2013).*
Machine Translation of JP 2008167583 A (Year: 2008).*
Extended European Search Report dated May 19, 2021, issued in corresponding European Patent Application No. 18924914.7.
International Search Report of the International Searching Authority dated Sep. 4, 2018 for the corresponding International application No. PCT/JP2018/023964 (and English translation).
Notice of Reasons for Refusal dated Feb. 25, 2020 issued in corresponding JP application No. 2019-537194 ( and English translation).
Notice of Reasons for Refusal dated Jul. 14, 2020 issued in corresponding JP application No. 2019-537194 ( and English translation).
Decision of Dismissal of Amendment dated Oct. 12, 2020 issued in corresponding JP application No. 2019-537194 and English translation).
Japanese Office Action dated Jan. 20, 2021, issued in corresponding JP Patent Application No. 2019-537194 (and English Machine Translation).
Indian Office Action dated Jun. 30, 2021, issued in corresponding IN Patent Application No. 202027055054.
Korean Office Action dated Oct. 20, 2022 issued in corresponding KR Patent Application No. 10-2020-7036096 (and English translation).

* cited by examiner

US 11,552,515 B2

ROTOR, MOTOR, FAN, AND AIR CONDITIONER

CROSS REFERENCE TO RELATED APPLICATION

This application is a U.S. national stage application of International Application No. PCT/JP2018/023964 filed on Jun. 25, 2018, the contents of which are incorporated herein by reference.

TECHNICAL FIELD

The present invention relates to a rotor, a motor, a fan, and an air conditioner.

BACKGROUND

Conventionally, in order to reduce the number of permanent magnets attached to a rotor of a motor, a consequent pole type rotor having a magnet magnetic pole and a pseudo-magnetic pole is developed. Further, in order to reduce noise, formation of a slit in the consequent pole type rotor is proposed (see, for example, Patent Reference 1).

PATENT REFERENCE

Patent Reference 1: Japanese Patent Application Publication No. 2012-244783 (see FIG. 14)

However, when a slit is formed in the rotor, there is a problem that a magnetic flux of the permanent magnet is blocked by the slit, and an output of the motor is reduced.

The present invention is intended to solve the above-described problem, and an object of the present invention is to suppress the reduction in the output of the motor while reducing noise of the motor.

SUMMARY

A rotor of the present invention includes a rotor core having an outer circumference of an annular shape surrounding a center axis and a magnet insertion hole formed along the outer circumference, and a permanent magnet disposed in the magnet insertion hole. The permanent magnet constitutes a first magnetic pole, and a part of the rotor core constitutes a second magnetic pole. The rotor core has a plurality of slits in the second magnetic pole. The plurality of slits is symmetrically formed with respect to a magnetic pole center line connecting a pole center of the second magnetic pole and the center axis. On one side of the magnetic pole center line in a circumferential direction about the center axis, the plurality of slits has a first slit closest to the magnetic pole center line and a second slit adjacent to the first slit in the circumferential direction. A minimum distance L1 from the first slit to the outer circumference of the rotor core and a minimum distance L2 from the second slit to the outer circumference of the rotor core satisfy L1<L2.

According to the present invention, the magnetic flux of the rotor can be concentrated on the pole center of the second magnetic pole by the first slit and the second slit. Thus, it is possible to reduce noise of the motor by suppressing torque ripple and to suppress reduction in the output of the motor.

DETAILED DESCRIPTION

First Embodiment (Configuration of Motor)

Figure 1:
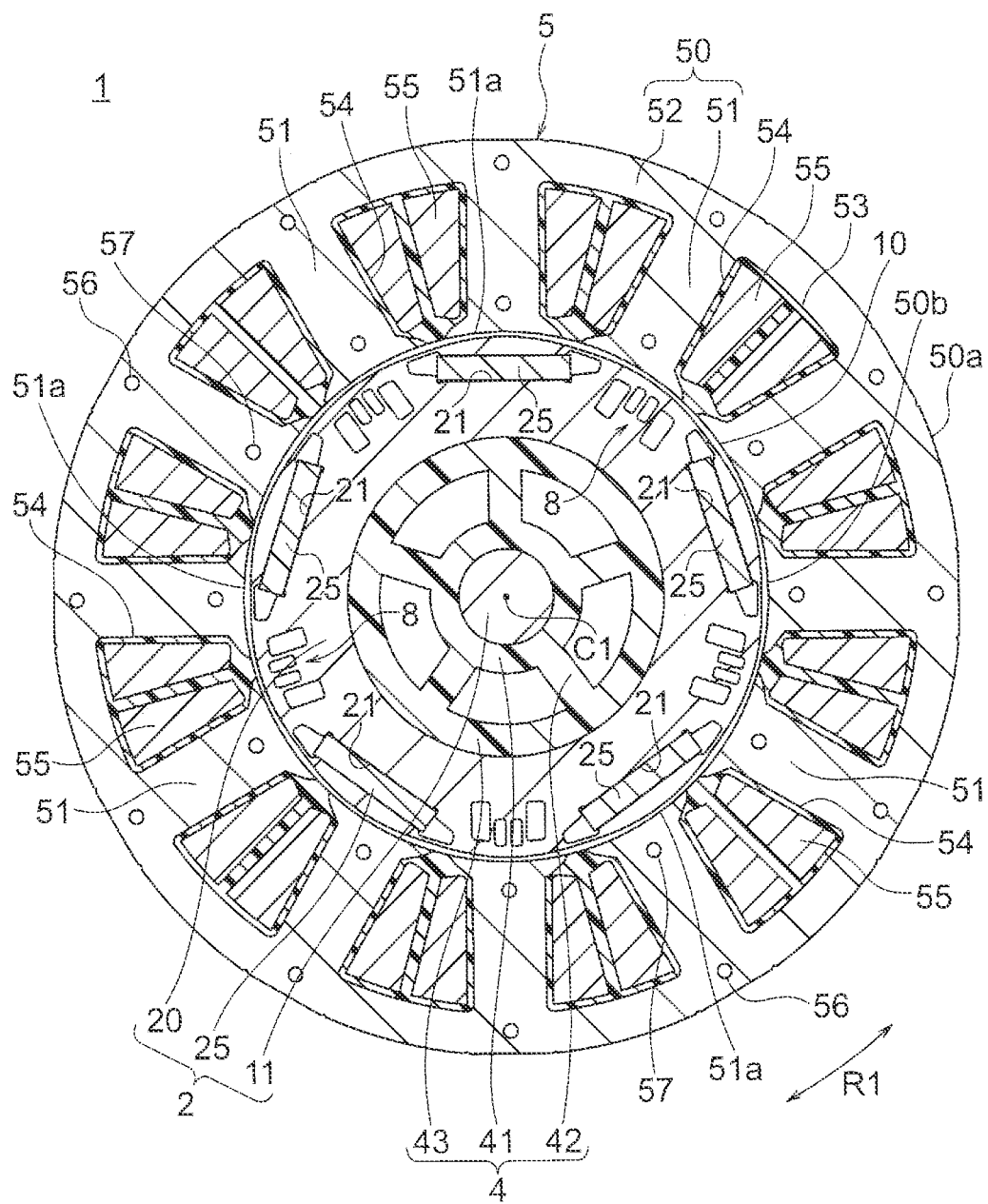
FIG. 1 is a cross-sectional view illustrating a motor of a first embodiment.

FIG. 1 is a cross-sectional view illustrating a motor 1 of a first embodiment. The motor 1 is an inner-rotor type motor that includes a rotatable rotor 2 and an annular stator 5 provided to surround the rotor 2. The motor 1 is also a permanent magnet embedded motor in which permanent magnets 25 are embedded in the rotor 2. An air gap (i.e., a gap) 10 of, for example, 0.4 mm is provided between the stator 5 and the rotor 2.

Hereinafter, an axis serving as a center of rotation of the rotor 2 is referred to as a center axis C1, and a direction of the center axis C1 is referred to as an "axial direction". A circumferential direction about the center axis C1 (indicated by the arrow R1 in FIG. 1) is referred to as a "circumferential direction", and a radial direction about the center axis C1 is referred to as a "radial direction". FIG. 1 is a cross-sectional view at a plane perpendicular to the center axis C1 of the rotor 2.

(Configuration of Stator)

The stator 5 includes a stator core 50 and coils 55 wound on the stator core 50. The stator core 50 is obtained by stacking stack elements each having a thickness of, for example, 0.2 mm to 0.5 mm in the axial direction and fixing the stack elements together by crimping or the like. In this example, the stack element is an electromagnetic steel sheet that contains iron (Fe) as a main component.

The stator core 50 has a yoke 52 having an annular shape about the center axis C1 and a plurality of teeth 51 extending inward in the radial direction (i.e., toward the center axis C1) from the yoke 52. The teeth 51 are arranged at equal intervals in the circumferential direction. The number of teeth 51 is 12 in this example but is not limited to 12. A slot 53, which is a space for accommodating the coil 55, is formed between adjacent teeth 51.

A tip end of the tooth 51 on an inner side in the radial direction has a width in the circumferential direction wider than other portions of the tooth 51. The tip end of the tooth 51 faces an outer circumference of the rotor 2 via the above-described air gap 10. Each of an outer circumference 50a of the stator core 50 (i.e., an outer circumference of the yoke 52) and an inner circumference 50b of the stator core 50 (i.e., the tip end of the tooth 51) has a circular annular shape.

Crimping portions for integrally fixing the stack elements of the stator core 50 are formed in the yoke 52 and the teeth 51 of the stator core 50, as indicated by reference characters 56 and 57. The crimping portions may be formed in any other positions as long as the stack elements are integrally fixed by the crimping portions.

An insulator 54 serving as an insulating portion is attached to the stator core 50. The insulator 54 is interposed between the stator core 50 and the coil 55 and insulates the stator core 50 from the coil 55. The insulator 54 is formed by integrally molding a resin with the stator core 50 or assembling a resin molded body, which is molded as a separate component, to the stator core 50.

The insulator 54 is formed of an insulating resin such as polybutylene terephthalate (PBT), polyphenylene sulfide (PPS), liquid crystal polymer (LCP), polyethylene terephthalate (PET) or the like. The insulator 54 can also be formed of an insulating resin film having a thickness of 0.035 to 0.4 mm.

The coil 55 is wound around the tooth 51 via the insulator 54. The coil 55 is formed of a material that contains copper or aluminum as a main component. The coil 55 may be wound around each tooth 51 (concentrated winding) or may be wound across a plurality of teeth 51 (distributed winding).

(Configuration of Rotor)

Figure 2:
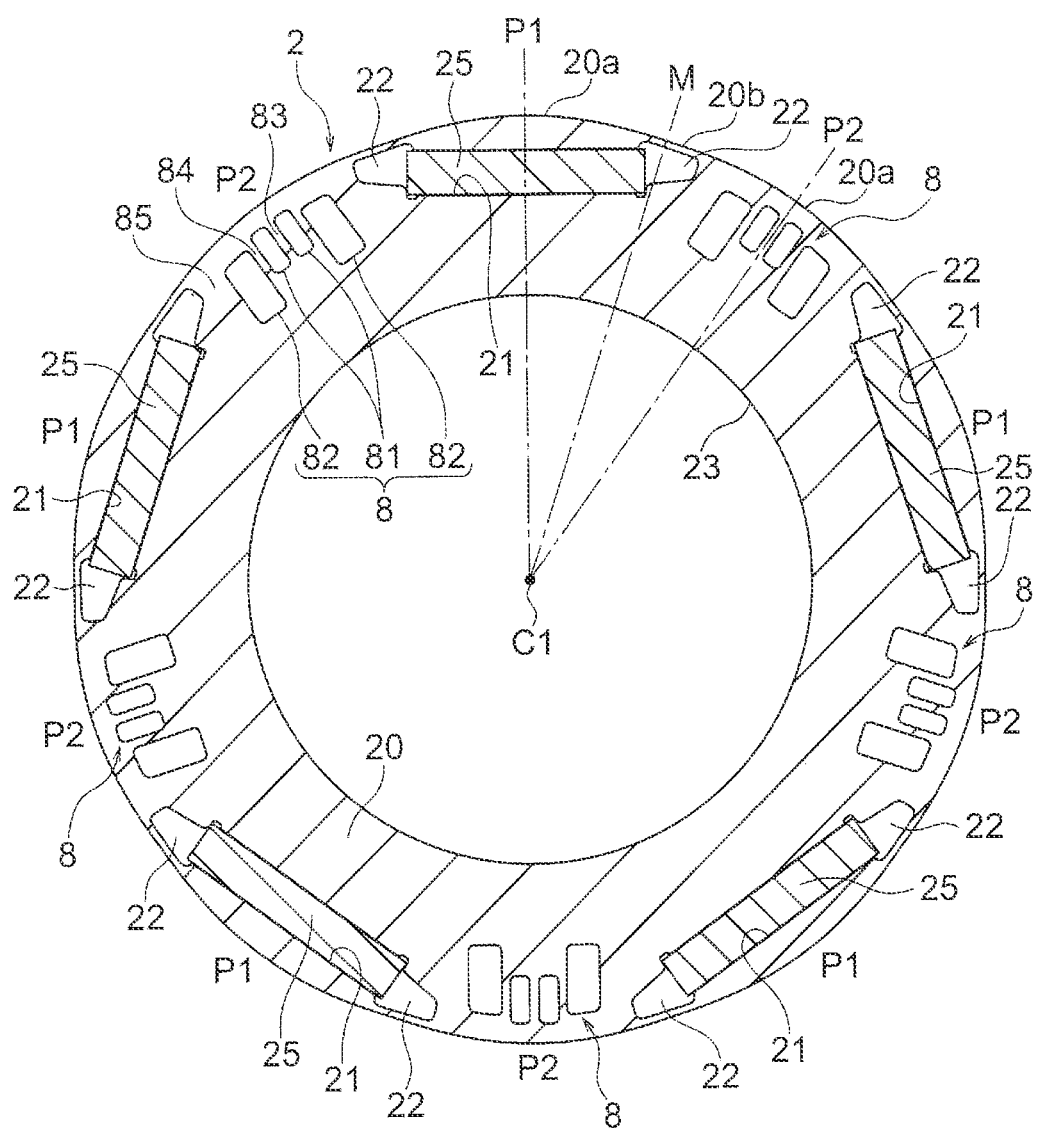
FIG. 2 is a cross-sectional view illustrating a rotor core and permanent magnets of the first embodiment.

FIG. 2 is a cross-sectional view illustrating a rotor core 20 and the permanent magnets 25. In FIG. 2, the resin portion 4 and the rotation shaft 11 are omitted. The rotor 2 has the cylindrical rotor core 20 about the center axis C1. The rotor core 20 is formed of magnetic stack elements each having a thickness of, example, 0.2 to 0.5 mm which are stacked in the axial direction and fixed together by crimping or the like. The stack element in this example is an electromagnetic steel sheet that contains iron as a main component. The rotor core 20 may be formed of a resin core that contains a combination of a soft magnetic material and a resin. A diameter of the rotor 2 is 50 mm in this example.

A plurality of magnet insertion holes 21 are formed along an outer circumference of the rotor core 20. The magnet insertion holes 21 are arranged at equal intervals in the circumferential direction. Each magnet insertion hole 21 has an elongated shape in the circumferential direction and passes through the rotor core 20 in the axial direction. More specifically, each magnet insertion hole 21 extends linearly in a direction perpendicular to a straight line (hereinafter referred to as a magnet pole center line) that passes through the center axis C1 and a pole center to be described later. The number of magnet insertion holes 21 is five in this example.

The permanent magnet 25 is disposed in each magnet insertion hole 21. The permanent magnet 25 is a member in the form of a flat plate and has a thickness in a direction in which the permanent magnet 25 faces the stator 5 (more specifically, in the radial direction of the rotor core 20). The permanent magnet 25 is magnetized in the thickness direction. The permanent magnet 25 is constituted by, for example, a rare earth magnet that contains neodymium (Nd) or samarium (Sm) as a main component, or a ferrite magnet that contains iron as a main component.

The permanent magnet 25 disposed in each magnet insertion hole 21 constitutes a magnet magnetic pole P1. The permanent magnets 25 are arranged so that pole-faces of the same polarity (for example, N pole) face the outer circumferential side of the rotor core 20. Thus, a portion through which a magnetic flux flows in the radial direction is formed between adjacent permanent magnets 25 in the rotor core 20. That is, a pseudo-magnetic pole P2 having an opposite polarity to that of the permanent magnet 25 is formed.

That is, the rotor 2 has five magnet magnetic poles P1 and five pseudo-magnetic poles P2 which are alternately arranged in the circumferential direction. Thus, the number of poles of the rotor 2 is ten. Such a rotor configuration is referred to as a consequent pole type. The number of poles of the rotor 2 is not limited to ten.

A center of the magnet magnetic pole P1 in the circumferential direction (i.e., a center of the magnet insertion hole 21 in the circumferential direction) is a pole center of the magnet magnetic pole P1. A center of the pseudo-magnetic pole P2 in the circumferential direction is a pole center of the pseudo-magnetic pole P2. A straight line that passes through the pole center and the center axis C1 is referred to as a magnetic pole center line. An inter-pole portion M is a portion between the magnet magnetic pole P1 and the pseudo-magnetic pole P2.

Although one permanent magnet 25 is disposed in one magnet insertion hole 21 in this example, a plurality of permanent magnets 25 may be disposed in one magnet insertion hole 21 side by side in the circumferential direction. In this case, the magnet insertion hole 21 may be formed in a V shape such that its center in the circumferential direction protrudes inward in the radial direction. An air hole may be formed on the inner side in the radial direction with respect to the magnet insertion hole 21 in the rotor core 20.

Figure 11:
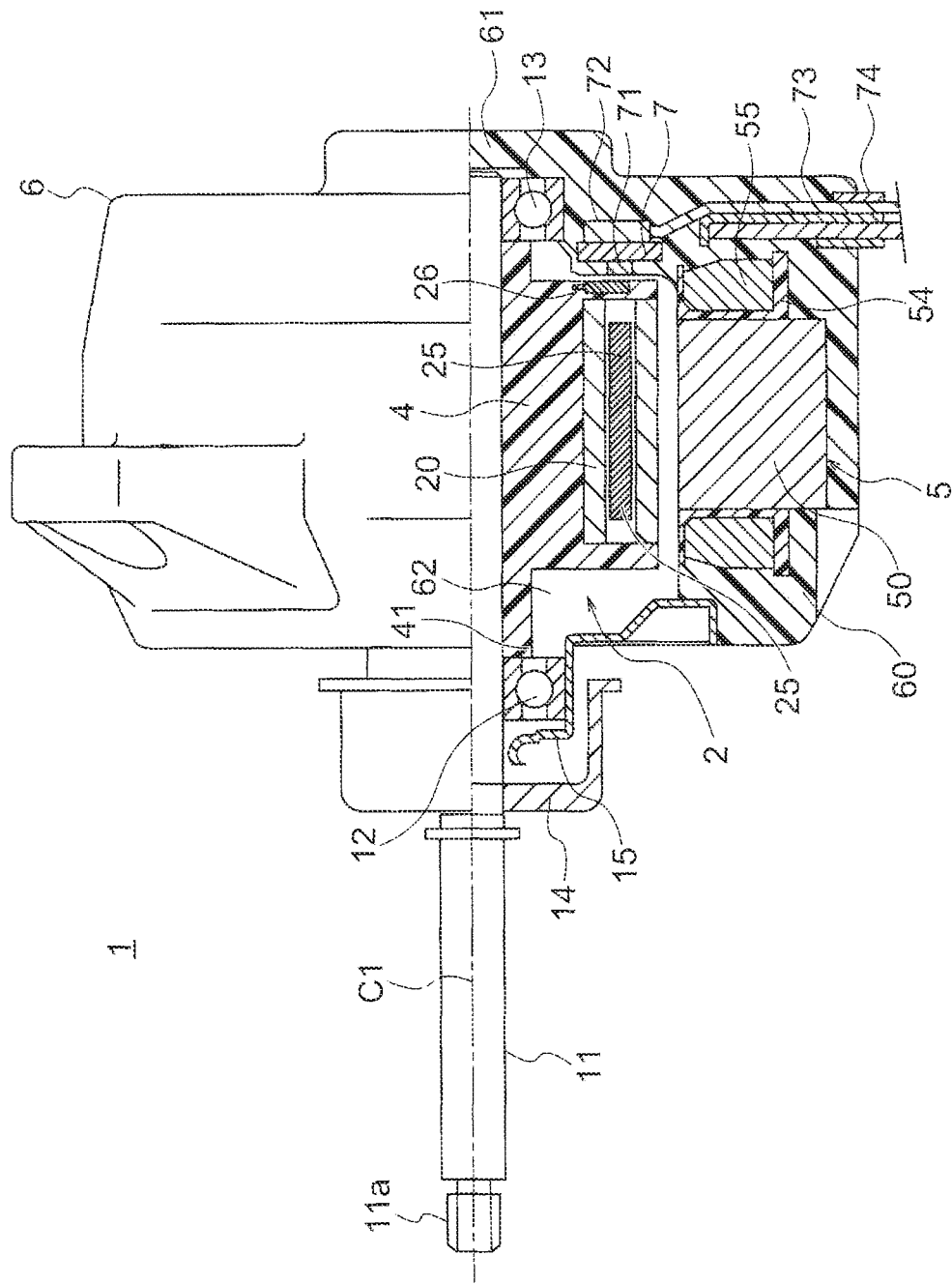
FIG. 11 is a longitudinal sectional view illustrating a mold motor to which the motor of the first embodiment is applied.

The rotor 2 has a rotation shaft 11 and a resin portion 4 on the inner side of the rotor core 20 in the radial direction. The rotation shaft 11 is rotatably supported by bearings 12 and 13 (FIG. 11). The above-described center axis C1 is a center axis of the rotation shaft 11. The rotation shaft 11 is formed of, for example, a metal such as iron (Fe), nickel (Ni), or chromium (Cr).

The resin portion (supporting portion) 4 supports the rotor core 20 with respect to the rotation shaft 11 and is formed of a non-magnetic material, more specifically, a thermoplastic resin such as polybutylene terephthalate (PBT) or the like. The resin portion 4 can be formed by molding the rotor core 20 and the rotation shaft 11 with resin.

The resin portion 4 includes an inner cylindrical portion 41 fixed to an outer circumference of the rotation shaft 11, an annular outer cylindrical portion 43 fixed to an inner circumference 23 of the rotor core 20, and a plurality of ribs (connecting portions) 42 connecting the inner cylindrical portion 41 and the outer cylindrical portion 43.

The rotation shaft 11 passes through the inner cylindrical portion 41 of the resin portion 4. The ribs 42 are arranged at equal intervals in the circumferential direction and radially extend outward in the radial direction from the inner cylindrical portion 41. The position where each rib 42 is formed corresponds to the center of the permanent magnet 25 in the circumferential direction (i.e., the pole center of the magnet magnetic pole P1). A hollow portion is formed between ribs 42 adjacent to each other in the circumferential direction.

The outer cylindrical portion 43 is continuous to outer ends of the ribs 42 in the radial direction.

Since the consequent pole type rotor 2 has no actual permanent magnet in the pseudo-magnetic pole P2, the magnetic flux passing through the pseudo-magnetic pole P2 tends to flow toward the rotation shaft 11. By providing the resin portion 4 between the rotor core 20 and the rotation shaft 11, leakage magnetic flux to the rotation shaft 11 can be suppressed effectively.

The outer circumference of the rotor core 20 has a flower shape such that its outer diameter is maximum at the pole center and is minimum at the inter-pole portion. More specifically, the outer circumference of the rotor core 20 has outer circumferential portions 20a whose centers are located at the pole centers of the magnetic poles (the magnet poles P1 and the pseudo-magnetic poles P2), and outer circumferential portions 20b whose centers are located at the inter-pole portions M. Both of the outer circumferential portions 20a and 20b are arc-shaped portions and have centers of curvature on the center axis C1 side, but the outer circumferential portions 20a and 20b have different radii of curvature.

The outer circumferential portion 20a whose center is located at the pole center of the magnet magnetic pole P1 may be referred to as a first outer circumferential portion. The outer circumferential portion 20a whose center is located at the pole center of the pseudo-magnetic pole P2 may be referred to as a second outer circumference. The outer circumferential portion 20b whose center is located at the inter-pole portion M may be referred to as a third outer circumferential portion.

A flux barrier 22, which is an opening, is formed on each of both ends of the magnet insertion hole 21 in the circumferential direction. The flux barrier 22 is provided for suppressing the leakage magnetic flux between the magnetic pole P1 and the pseudo-magnetic pole P2.

A core portion between the flux barrier 22 and the outer circumference of the rotor core 20 is a thin-wall portion (also referred to as a bridge portion). A thickness of the thin-wall portion is desirably the same as a thickness of each of the stack elements forming the rotor core 20. Thus, the leakage magnetic flux between the adjacent magnetic poles can be suppressed. The flux barrier 22 in this example is disposed on each of both ends of the magnet insertion hole 21 in the circumferential direction but may be disposed only on one end of the magnet insertion hole 21 in the circumferential direction.

The outer circumference of the rotor core 20 has the flower shape as described above, but the inner circumference 50b of the stator core 50 has a circular annular shape. Thus, a width of the air gap 10 between the stator 5 and the rotor 2 is minimum at the pole center of each magnet pole (each of the magnet magnetic pole P1 and the pseudo-magnetic pole P2), and is maximum at the inter-pole portion M.

Figure 3:
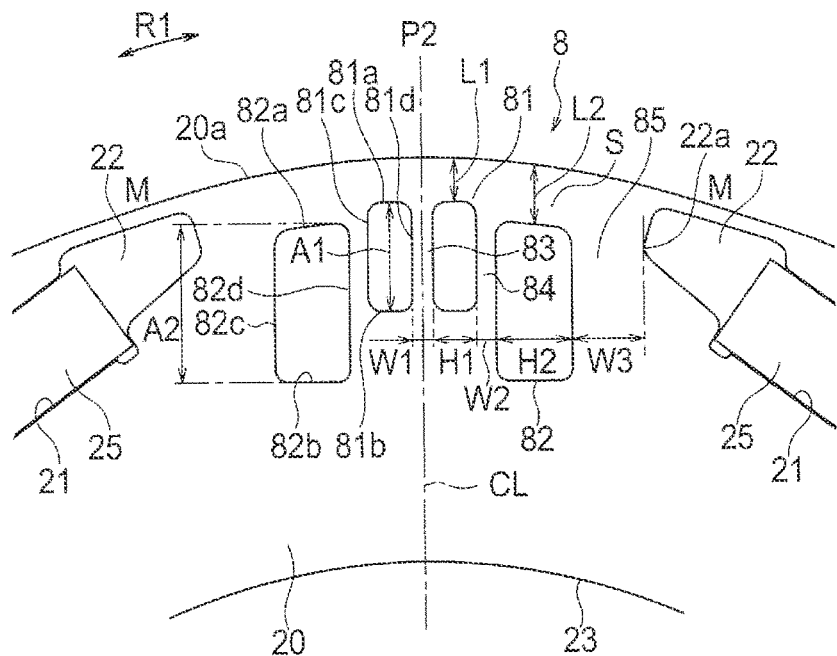
FIG. 3 is an enlarged cross-sectional view illustrating a part of a rotor of the first embodiment.

FIG. 3 is an enlarged diagram illustrating a portion including the pseudo-magnetic pole P2 of the rotor 2. The rotor core 20 has a slit group 8 including a plurality of slits 81 and 82 in each pseudo-magnetic pole P2. In the first embodiment, the slit group 8 has two first slits 81 closest to the magnetic pole center line (indicated by the mark CL in FIG. 3) of the pseudo-magnetic pole P2 and two second slits 82 formed on both sides of these two first slits 81 in the circumferential direction.

The first slits 81 are formed symmetrically with respect to the magnetic pole center line CL of the pseudo-magnetic pole P2. The second slits 82 are formed symmetrically with respect to the magnetic pole center line CL of the pseudo-magnetic pole P2. More specifically, the two first slits 81 are formed at symmetrical positions and have symmetrical shapes with respect to the magnetic pole center line CL. The two second slits 82 are formed at symmetrical positions and have symmetrical shapes with respect to the magnetic pole center line CL.

Figure 12:
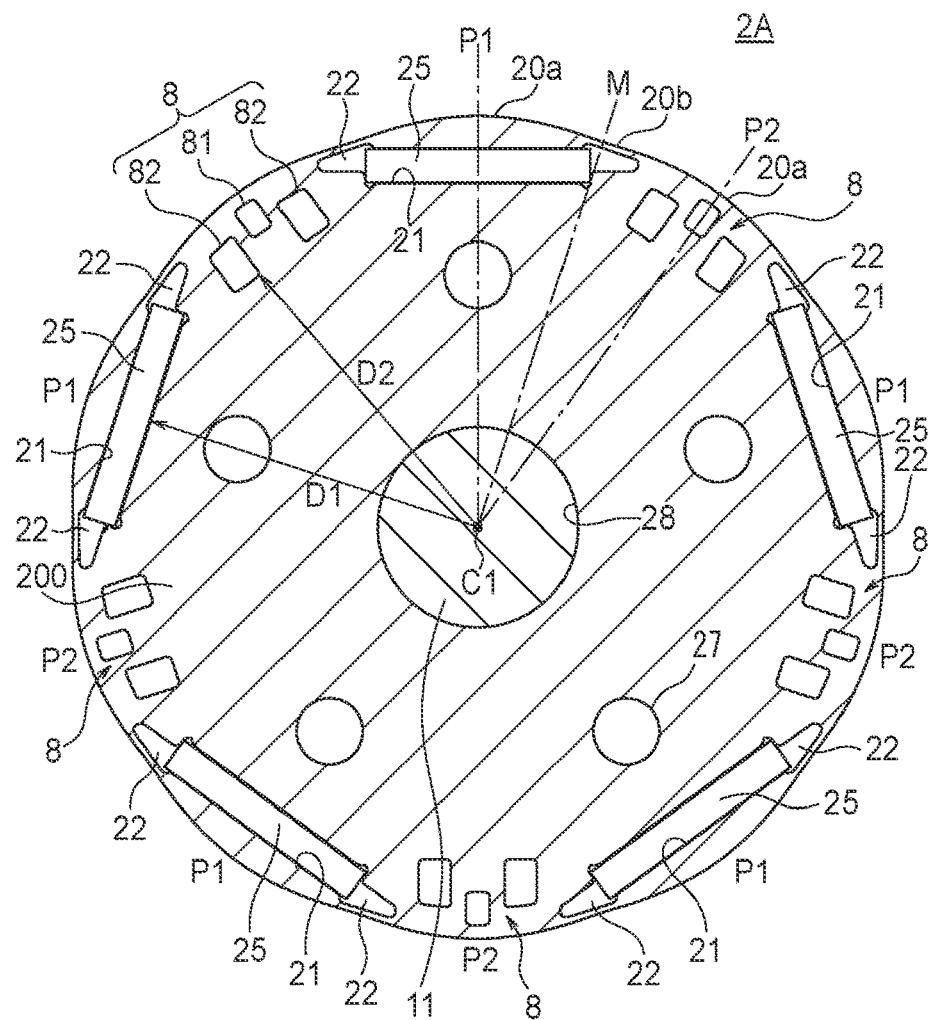
FIG. 12 is a cross-sectional view illustrating a rotor of a second embodiment.
Figure 13:
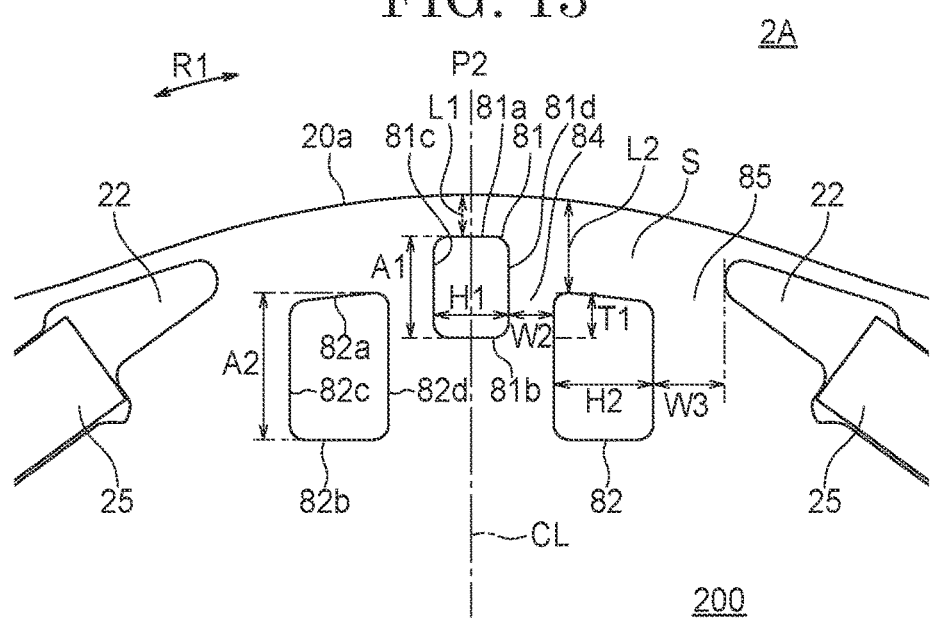
FIG. 13 is an enlarged cross-sectional view illustrating a part of the rotor of the second embodiment.

Instead of providing the two first slits 81, one first slit 81 may be provided on the magnetic pole center line CL. This configuration will be described in a second embodiment (FIGS. 12 and 13).

The first slit 81 has a shape elongated in the radial direction. More specifically, the first slit 81 has an end portion 81a on an outer side in the radial direction, an end portion 81b on an inner side in the radial direction, an end portion 81c on an outer side in the circumferential direction (i.e., on a side far from the magnetic pole center line CL), and an end portion 81d on an inner side in the circumferential direction (i.e., on a side close to the magnetic pole center line CL).

The end portions 81a and 81b of the first slit 81 extend perpendicularly to the magnetic pole center line CL. The end portions 81c and 81d extend in parallel to the magnetic pole center line CL. A length A1 of the first slit 81 (i.e., an interval between the end portions 81a and 81b) is longer than a width H1 of the first slit 81 (i.e., an interval between the end portions 81c and 81d).

The second slit 82 has a shape elongated in the radial direction. More specifically, the second slit 82 has an end portion 82a on an outer side in the radial direction, an end portion 82b on an inner side in the radial direction, an end portion 82c on an outer side in the circumferential direction (i.e., on a side far from the magnetic pole center line CL), and an end portion 82d on an inner side in the circumferential direction (i.e., on a side close to the magnetic pole center line CL).

The end portion 82a of the second slit 82 extends along the outer circumferential portion 20a. The end portion 82b extends perpendicularly to the magnetic pole center line CL. The end portions 82c and 82d extend in parallel to the magnetic pole center line CL. A length A2 of the second slit 82 (i.e., an interval between the end portions 82a and 82b) is longer than a width H2 of the second slit 82 (i.e., an interval between the end portions 82c and 82d).

The length A1 of the first slit 81 is shorter than the length A2 of the second slit 82, and the width H1 of the first slit 81 is narrower than the width H2 of the second slit 82. That is, a cross-sectional area of the first slit 81 is smaller than a cross-sectional area of the second slit 82.

A thin-wall portion 83 is formed between the two first slits 81. The thin-wall portion 83 has a width W1 which is the minimum width in the circumferential direction (i.e., the minimum interval between the end portions 81d of the two first slits 81). The width of the thin-wall portion 83 is constant along the radial direction in FIG. 3 but is not necessarily constant. The thin-wall portion 83 is also referred to as a pole-center thin-wall portion because it is located on the magnetic pole center line CL.

A thin-wall portion 84 is formed between the first slit 81 and the second slit 82. The thin-wall portion 84 has a width W2 which is the minimum width in the circumferential direction (i.e., the minimum interval between the end portion 81c of the first slit 81 and the end portion 82d of the second slit 82). The width of the thin-wall portion 84 is constant along the radial direction in FIG. 3 but is not necessarily constant. The thin-wall portion 84 is also referred to as an inter-slit thin-wall portion.

A core region 85 is formed between the second slit 82 and the flux barrier 22. The core region 85 has a width W3 between the second slit 82 and an end 22a of the flux barrier 22 closest to the magnetic pole center line CL. The width W3 is the minimum width of the core region 85 in the circumferential direction.

A distance L1 is defined as the minimum distance between the first slit 81 and the outer circumferential portion 20a (i.e., the minimum distance between the end portion 81a of the first slit 81 and the outer circumferential portion 20a). A distance L2 is defined as the minimum distance between the second slit 82 and the outer circumferential portion 20a (i.e., the minimum distance between the end portion 82a of the second slit 82 and the outer circumferential portion 20a). The distances L1 and L2 satisfy the relationship of L1<L2.

(Action)

Next, the action of the first embodiment will be described. In order to cause the magnetic flux distribution on the surface (i.e., outer circumferential surface) of the rotor 2 to approach a sinusoidal wave, it is effective to vary in the circumferential direction the gap between the rotor 2 and the stator 5. With a configuration in which the gap between the rotor 2 and the stator 5 is minimum at the pole center of each of the magnetic poles (the magnet magnetic poles P1 and the pseudo-magnetic poles P2) and increases as a distance from the pole center increases, the magnetic flux is concentrated on the pole center. Thus, the surface magnetic flux distribution of the rotor 2 approaches the sinusoidal wave.

In the consequent pole type rotor 2, a degree of freedom of the magnetic flux flowing through the pseudo-magnetic pole P2 is high, and thus the surface magnetic flux of the rotor 2 significantly changes depending on the rotational positions of the rotor 2 relative to the stator 5. Thus, by providing the slits 81 and 82 in the pseudo-magnetic pole P2 to restrict the degree of freedom of the magnetic flux, the effect of causing the surface magnetic flux distribution of the rotor 2 to approach the sinusoidal wave can be enhanced.

Figure 4:
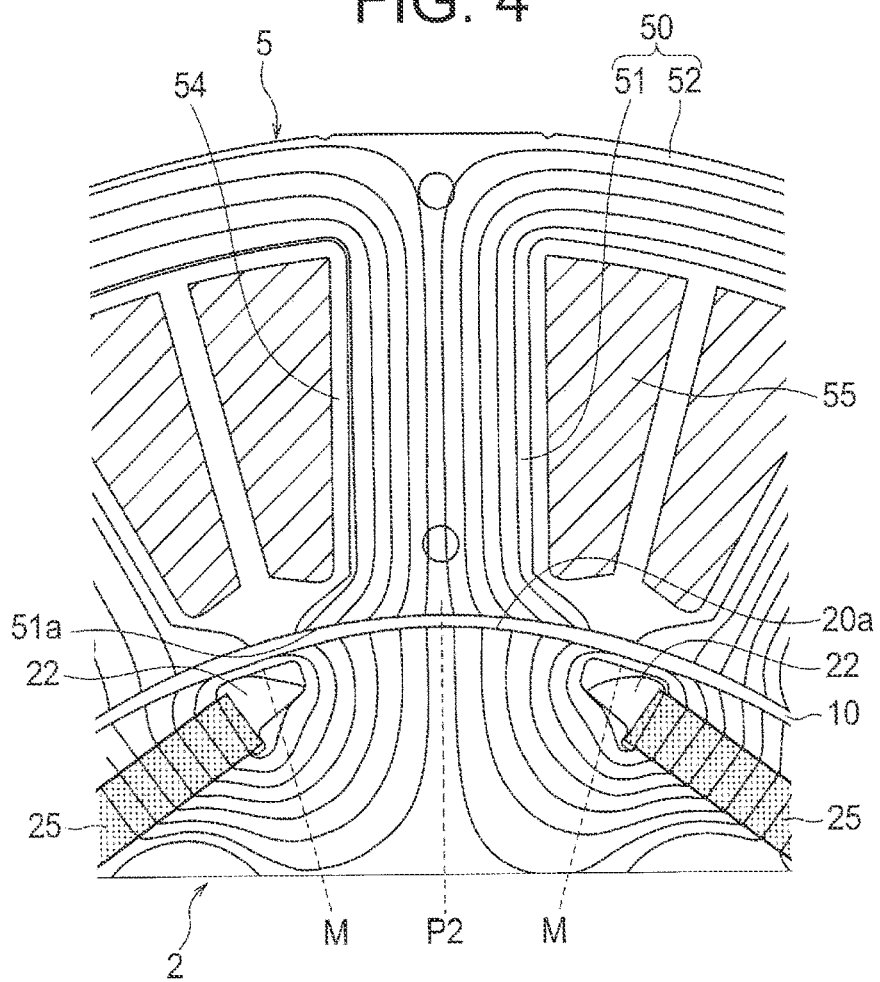
FIG. 4 is a schematic diagram illustrating the flow of a magnetic flux in the motor of the first embodiment.

FIG. 4 is a schematic diagram illustrating a result of simulation of the magnetic flux flowing through the pseudo-magnetic pole P2 in a case where neither the slit 81 nor the slit 82 is provided in the pseudo-magnetic pole P2. The magnetic flux emitted from the permanent magnet 25 of the magnet magnetic pole P1 flows through the pseudo-magnetic pole P2 and then flows into the tooth 51 via the air gap 10. The magnetic flux flowing into the tooth 51 flows into the yoke 52 located on the outer side of the tooth 51 in the radial direction, further flows through an adjacent tooth 51 inward in the radial direction, and then returns to the permanent magnet 25.

The magnetic flux passes through portions in which magnetic resistance is low. The magnetic resistance decreases as a magnetic path is shortened. Thus, in the pseudo-magnetic pole P2, the magnetic flux is more likely to be concentrated on a region close to the magnet magnetic pole P1 (i.e., a region close to the inter-pole portion M), and thus the amount of magnetic flux flowing through the pole center of the pseudo-magnetic pole P2 is relatively small.

Figure 5:
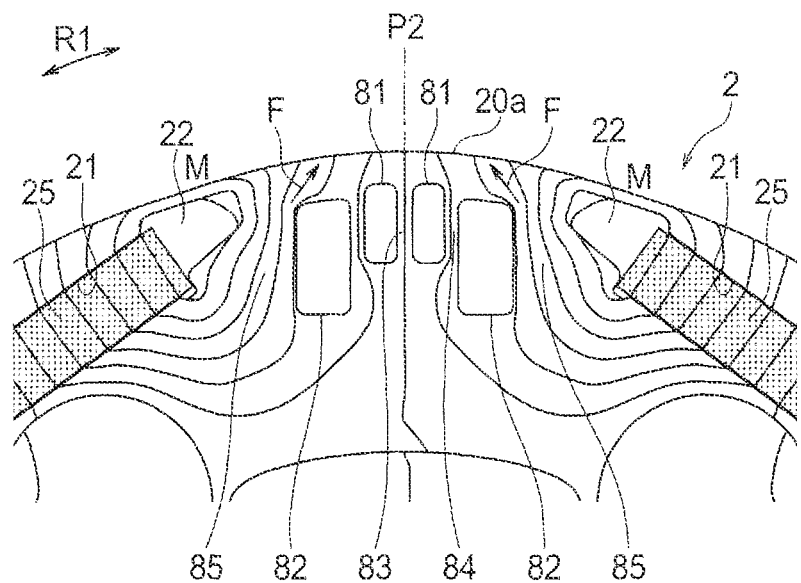
FIG. 5 is a schematic diagram illustrating the flow of a magnetic flux in a pseudo-magnetic pole of the rotor of the first embodiment.

FIG. 5 is a schematic diagram illustrating a result of simulation of the magnetic flux flowing through the pseudo-magnetic pole P2 in a case where the slits 81 and 82 are provided in the pseudo-magnetic pole P2. When the slits 81 and 82 are provided in the pseudo-pole P2, the magnetic resistance can be adjusted by utilizing magnetic saturation in a core portion, and thus it is possible to control the distribution of the magnetic flux flowing through the pseudo-magnetic pole P2. By arranging the plurality of slits 81 and 82 in a symmetrical manner with respect to the magnetic pole center line CL, the magnetic flux distribution can be caused to approach a symmetrical distribution with respect to the magnetic pole center line CL.

In particular, when the distance L2 (FIG. 3) from the second slit 82 to the outer circumferential portion 20a is made longer than the distance L1 (FIG. 3) from the first slit 81 to the outer circumferential portion 20a, the magnetic flux decreases as compared to the case where none of these slits are provided, but a magnetic flux flowing from a region close to the inter-pole portion M toward the pole center of the pseudo-magnetic pole P2 can be generated as indicated by the arrow F in FIG. 5.

Thus, it is possible to achieve a sinusoidal magnetic flux distribution in which the magnetic flux is concentrated on the pole center of the pseudo-magnetic pole P2 and decreases toward the inter-pole portion M. That is, a spatial harmonic of the surface magnetic flux of the rotor 2 is suppressed, so that torque ripple can be suppressed. Thus, noise of the motor 1 can be reduced.

The distance L2 (FIG. 3) from the second slit 82 to the outer circumferential portion 20a is longer than the distance L1 (FIG. 3) from the first slit 81 to the outer circumferential portion 20a, and the second slit 82 is on the inter-pole portion side where the magnetic flux is more likely to be concentrated. Thus, the magnetic flux concentratedly flowing through a region close to the inter-pole portion M is blocked as little as possible. Thus, a decrease in the magnetic flux interlinking with the coil 55 (FIG. 1) of the stator 5 can be suppressed, and thus the reduction in the output of the motor 1 is suppressed.

The results of simulation illustrated in FIGS. 4 and 5 are obtained in the case where the air hole is provided on the inner side of the magnet insertion hole 21 in the radial direction, but the influence of the presence or absence of the air hole is negligible with regard to the effect of the slits 81 and 82 on the surface magnetic flux of the rotor 2.

Figure 6:
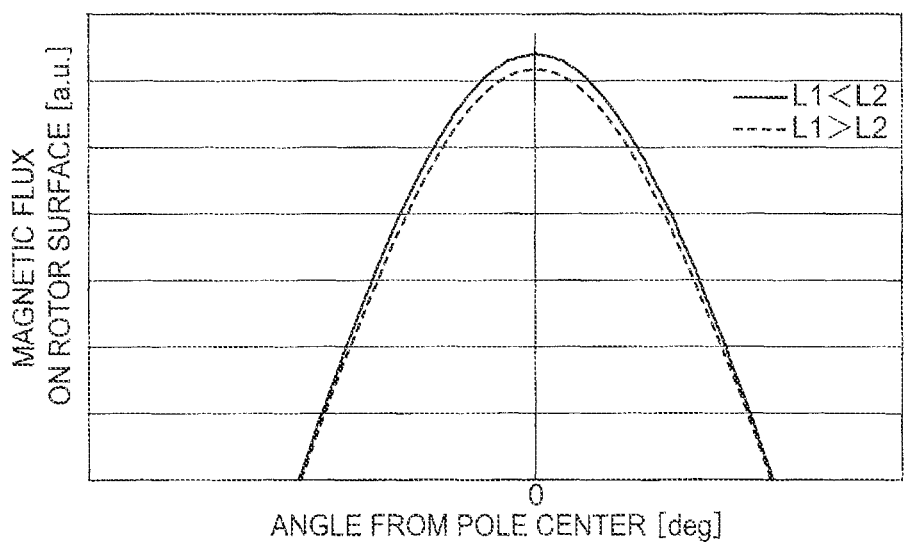
FIG. 6 is a graph illustrating a surface magnetic flux distribution of the rotor of the motor.

FIG. 6 is a graph illustrating the distribution of the magnetic flux of the rotor 2 (hereinafter simply referred to as a rotor magnetic flux) interlinking with the coil 55 in the motor 1 of the first embodiment and that in a motor of a comparative example in comparison with each other. In FIG. 6, the vertical axis represents the surface magnetic flux of the rotor 2 and the horizontal axis represents an angle about the pole center of the pseudo-magnetic pole P2. The motor of the comparative example is configured in a similar manner to the motor 1 of the first embodiment except that the distances L1 and L2 from the slits 81 and 82 to the outer circumferential portion 20a satisfy L1>L2.

In FIG. 6, the solid line represents the distribution of the rotor magnetic flux in the motor 1 of the first embodiment when L1=1 mm, L2=1.35 mm (therefore, L2/L1=1.35). The dashed line represents the distribution of the rotor magnetic flux in the motor of the comparative example when L1=1 mm, L2=0.75 mm (therefore, L1/L2=1.33). These values of L1 and L2 are selected so that substantially the same value is obtained when a longer distance of L1 and L2 is divided by a shorter distance of L1 and L2.

From FIG. 6, it is understood that the surface magnetic flux of the rotor 2 in the motor 1 of the first embodiment is higher than that in the motor of the comparative example. It is understood that, particularly in the pole center of the pseudo-magnetic pole P2, the surface magnetic flux of the rotor 2 in the motor 1 of the first embodiment is higher than that in the motor of the comparative example.

Next, the dimensions of the thin-wall portions 83 and 84 and the core region 85 will be described. As described above, the thin-wall portion 83 between the two first slits 81 has the width W1. The thin-wall portion 84 between the first slit 81 and the second slit 82 has the width W2. The core region 85 between the second slit 82 and the flux barrier 22 has the width W3.

Figure 7:
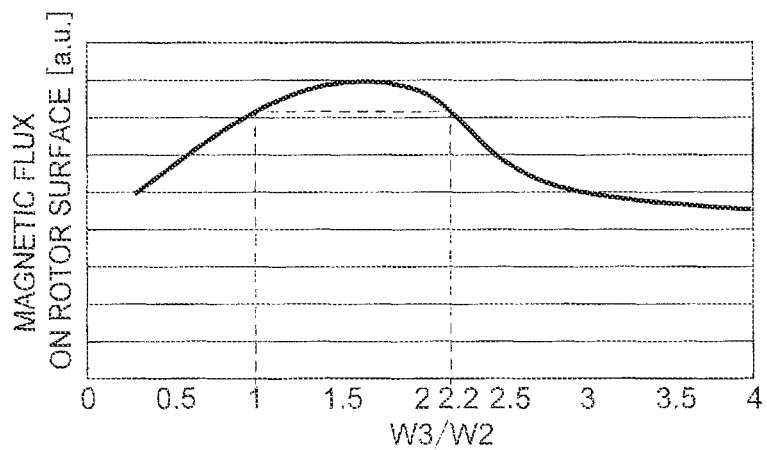
FIG. 7 is a graph illustrating the relationship between the surface magnetic flux of the rotor of the motor and W3/W2.

FIG. 7 is a graph illustrating the relationship between the ratio W3/W2 of the width W3 of the core region 85 to the width W2 of the thin-wall portion 84 and the surface magnetic flux of the rotor 2. From FIG. 7, it is understood that the value of the surface magnetic flux of the rotor 2 is high particularly when W3/W2 is in a range of 1≤W3/W2≤2.2.

This is because of the following reasons. Since the width W3 of the core region 85 is greater than or equal to the width W2 of the thin-wall portion 84 (i.e., 1≤W3/W2), the magnetic flux concentratedly flowing through the region close to the inter-pole portion M is blocked as little as possible. Further, since the width W2 of the thin-wall portion 84 is not extremely narrow (i.e., W3/W2≤2.2), an increase in the magnetic resistance of the thin-wall portion 84 can be suppressed.

By suppressing a significant decrease in the surface magnetic flux of the rotor 2 as above, the magnetic flux interlinking with the coil 55 of the stator 5 is increased. As a result, the reduction in the output of the motor 1 can be suppressed.

Figure 8:
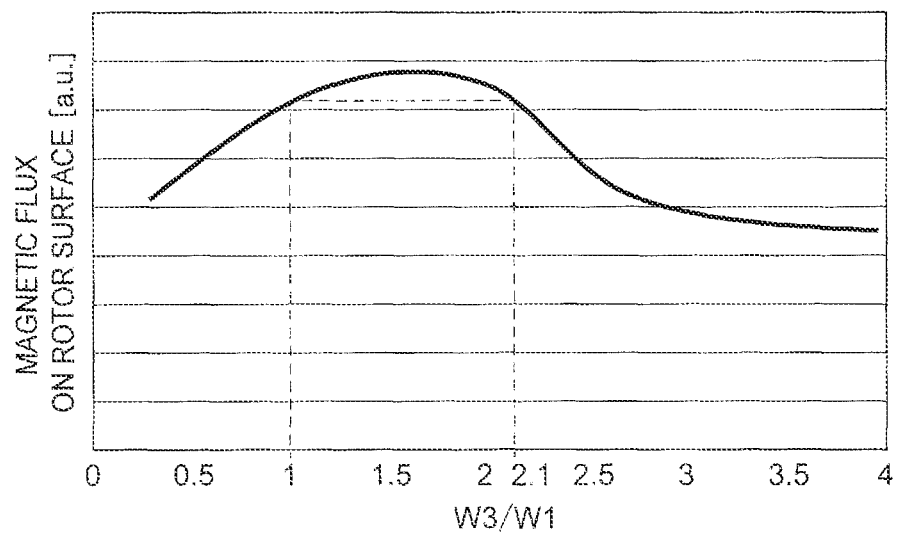
FIG. 8 is a graph illustrating the relationship between the surface magnetic flux of the rotor of the motor and W3/W1.

FIG. 8 is a graph illustrating the relationship between the ratio W3/W1 of the width W3 of the core region 85 to the width W1 of the thin-wall portion 83 and the surface magnetic flux of the rotor 2. From FIG. 8, it is understood that the surface magnetic flux of the rotor 2 is particularly high when W3/W1 is in a range of 1≤W3/W1≤2.1.

This is because of the following reasons. Since the width W3 of the core region 85 is greater than or equal to the width W1 of the thin-wall portion 83 (i.e., 1≤W3/W1), the magnetic flux concentratedly flowing through the region close to the inter-pole portion M is blocked as little as possible. Further, since the width W1 of the thin-wall portion 83 is not extremely narrow (i.e., W3/W1≤2.1), an increase in the magnetic resistance of the thin-wall portion 83 can be suppressed.

By suppressing a significant decrease in the surface magnetic flux of the rotor 2 as above, the magnetic flux interlinking with the coil 55 of the stator 5 is increased. As a result, the reduction in the output of the motor 1 can be suppressed.

In FIG. 3, the sum (W1+W2) of the width W1 of the thin-wall portion 83 and the width W2 of the thin-wall portion 84 and the width W3 of the core region 85 desirably satisfy W1+W2≤W3.

By making the width W3 of the core region 85 greater than or equal to the sum (W1+W2) of the widths W1 and W2 of the thin-wall portions 83 and 84, the magnetic flux flowing through the region close to the inter-pole portion M is more likely to flow toward the pole center of the pseudo-magnetic pole P2 through the core region 85. Thus, it is possible to enhance the effect of causing the surface magnetic flux distribution of the rotor 2 to approach the sinusoidal wave. Furthermore, the magnetic flux interlinking with the coil 55 of the stator 5 is increased by suppressing a significant decrease in the surface magnetic flux of the rotor 2. As a result, the reduction in the output of the motor 1 can be suppressed.

In addition, the distance L2 between the second slit 82 and the outer circumferential portion 20a of the rotor 2 is desirably greater than or equal to the sum (W1+W2) of the widths W1 and W2 of the thin-wall portions 83 and 84. In other words, W1+W2≤L2 is desirably satisfied.

With this configuration, a magnetic path from the core region 85 toward the pole center of the pseudo-magnetic pole P2 via a magnetic path (indicated by the sign S in FIG. 3) on the outer circumferential side of the second slit 82 is wider, and the magnetic resistance therein is reduced, as compared with magnetic paths toward the pole center of the pseudo-magnetic pole P2 via the thin-wall portions 83 and 84. Thus, it is possible to enhance the effect of causing the surface magnetic flux distribution of the rotor 2 to approach the sinusoidal wave. Furthermore, the magnetic flux interlinking with the coil 55 of the stator 5 is increased by suppressing a significant decrease in the amount of the surface magnetic flux of the rotor 2. As a result, the reduction in the output of the motor 1 can be suppressed.

Figure 9:
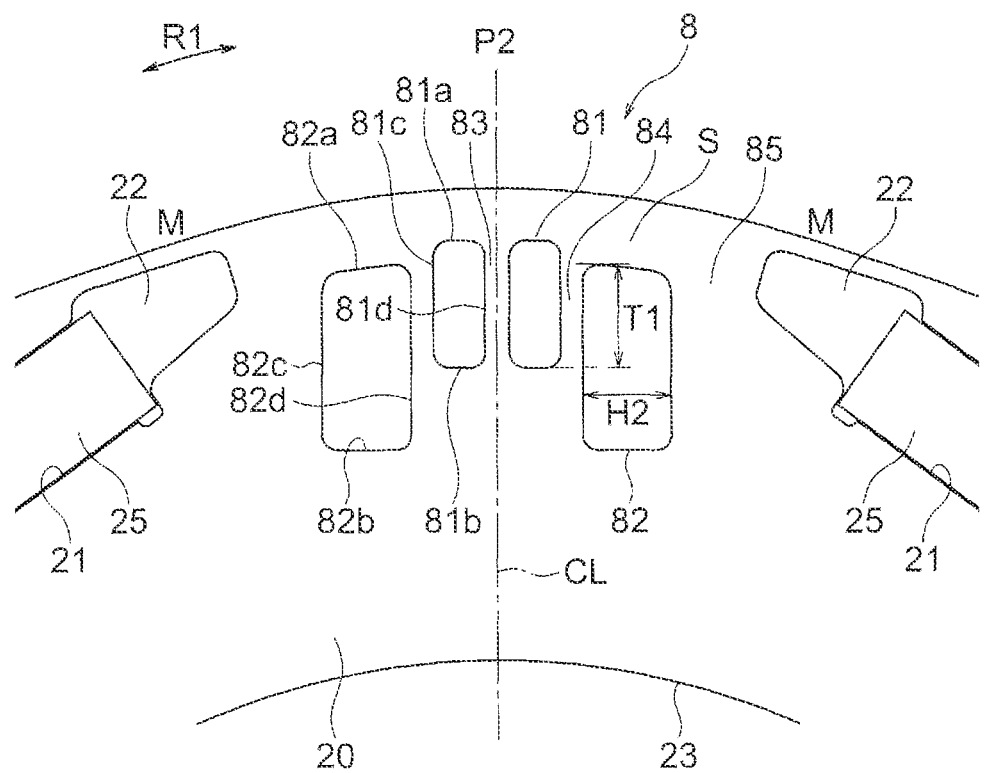
FIG. 9 is an enlarged cross-sectional view illustrating a part of the rotor of the first embodiment.

FIG. 9 is an enlarged diagram illustrating a portion including the pseudo-magnetic pole P2 of the rotor 2. In FIG. 9, a length T1 is defined as the length of the thin-wall portion 84 between the first slit 81 and the second slit 82 in the radial direction. The length T1 is desirably greater than the width H2 of the second slit 82 in the circumferential direction (i.e., T1>H2 is satisfied).

The width H2 of the second slit 82 is equal to the length of the magnetic path S on the outer side of the second slit 82 in the radial direction. When both of the thin-wall portion 84 and the magnetic path S on the outer side of the second slit 82 in the radial direction reach a magnetic saturation state at which the magnetic flux density is, for example, 1.6 T, the magnetic flux flows through the shorter one of the magnetic paths in which the magnetic saturation occurs. Thus, when the length T1 of the thin-wall portion 84 is longer than the width H2 of the second slit 82, the magnetic flux flows more through the magnetic path S on the outer side of the second slit 82 in the radial direction than through the thin-wall portion 84.

Therefore, the magnetic flux flowing through the region close to the inter-pole portion M can be guided toward the pole center of the pseudo-magnetic pole P2 through the magnetic path S on the outer side of the second slit 82 in the radial direction. As a result, the effect of causing the surface magnetic flux distribution of the rotor 2 to approach the sinusoidal wave can be enhanced, and the reduction in the output of the motor 1 can be suppressed.

Figure 10:
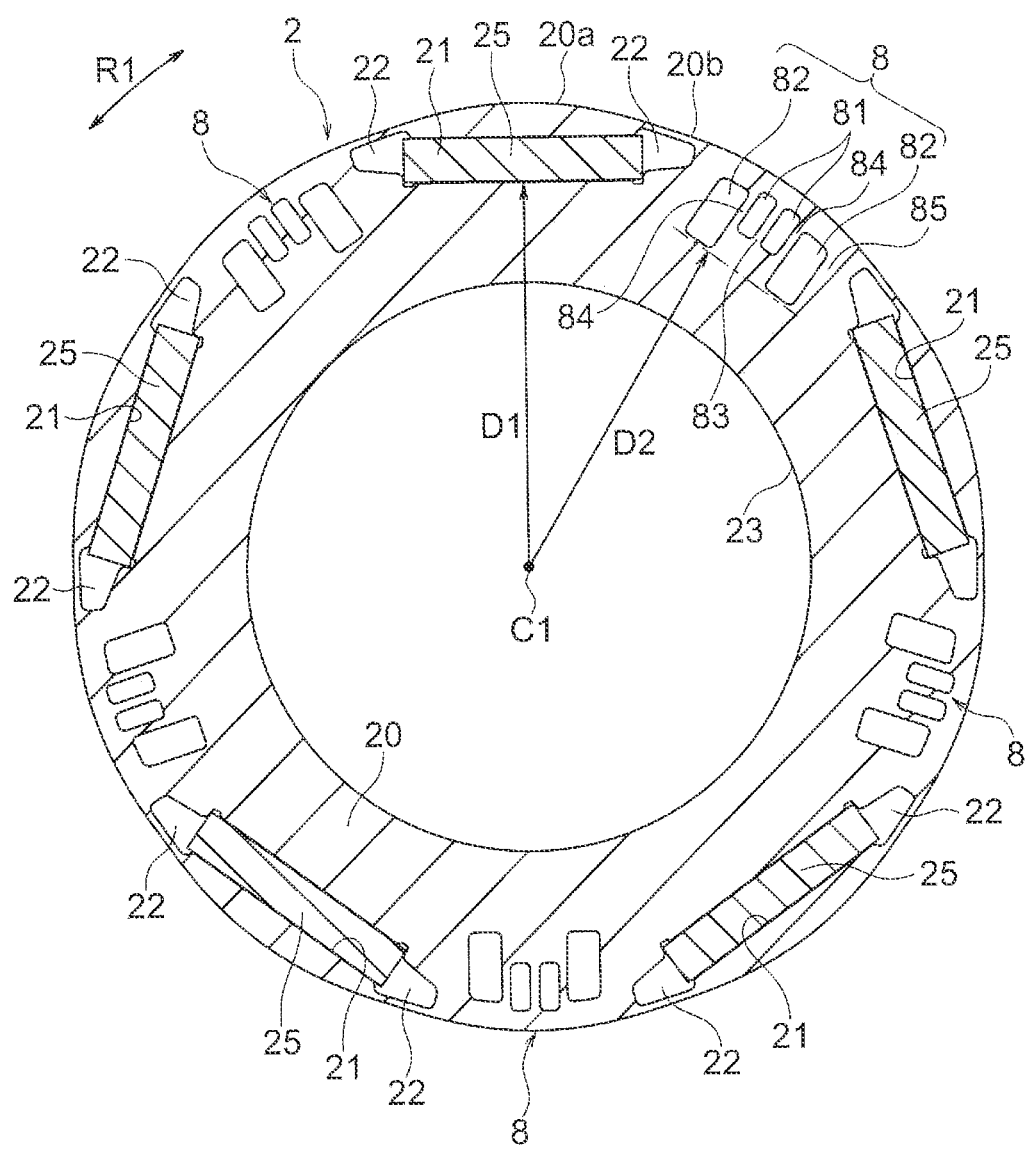
FIG. 10 is a cross-sectional view illustrating the rotor core and the permanent magnets of the first embodiment.

FIG. 10 is a diagram for explaining the positions of the slits 81 and 82 in the radial direction in the rotor 2. A minimum distance D1 from the center axis C1 of the rotor 2 to the magnet insertion hole 21 is desirably longer than a minimum distance D2 from the center axis C1 to the second slit 82 (i.e., D1>D2 is satisfied).

The magnetic flux from the permanent magnet 25 flows through an end portion of the magnet insertion hole 21 on the inner side in the radial direction toward the pseudo-magnetic pole P2. When the minimum distance D1 from the center axis C1 to the magnet insertion hole 21 is shorter than the minimum distance D2 from the center axis C1 to the second slit 82 (i.e., D1<D2 is satisfied), most of the magnetic flux emitted from the permanent magnet 25 flows into the thin-wall portion 84. This is because the second slit 82 is not present on a magnetic path connecting the permanent magnet 25 and the thin-wall portion 84 by the shortest distance.

In contrast, as illustrated in FIG. 10, when the minimum distance D1 from the center axis C1 to the magnet insertion hole 21 is longer than the minimum distance D2 from the center axis C1 to the second slit 82, the magnetic flux emitted from the permanent magnet 25 and flowing into the thin-wall portion 84 is reduced. This is because the second slit 82 is present on the magnetic path connecting the permanent magnet 25 and the thin-wall portion 84 by the shortest distance and the second slit 82 serves as a magnetic barrier.

The magnetic flux flowing through the core region 85 increases with a decrease in the magnetic flux flowing into the thin-wall portion 84. This results in an increase in the magnetic flux flowing toward the pole center of the pseudo-magnetic pole P2 through the magnetic path S on the outer side of the second slit 82 in the radial direction. Thus, it is possible to enhance the effect of causing the surface magnetic flux distribution of the rotor 2 to approach the sinusoidal wave, and to suppress the reduction in the output of the motor 1.

(Configuration of Mold Motor)

FIG. 11 is a longitudinal sectional view illustrating a mold motor to which the motor 1 of the first embodiment is applied. The stator 5 is covered with a mold resin portion 60 to constitute a mold stator 6.

The mold resin portion 60 is formed of, for example, a thermosetting resin such as a bulk molding compound (BMC) or the like. The mold resin portion 60 has an opening 62 on the left side (a load side described later) in FIG. 11 and a bearing supporting portion 61 on the opposite side to the opening 62 (a counter-load side described later). The rotor 3 is inserted through the opening 62 into a hollow portion inside the stator 5.

A metal bracket 15 is mounted to the opening 62 of the mold resin portion 60. One bearing 12 that supports the rotation shaft 11 is held by the bracket 15. A cap 14 for preventing water or the like from entering the bearing 12 is mounted outside the bracket 15. The other bearing 13 that supports the rotation shaft 11 is held by the bearing supporting portion 61.

The rotation shaft 11 protrudes from the stator 5 to the left side in FIG. 11. For example, an impeller of a fan is attached to a tip end 11a of the rotation shaft 11. Thus, the protruding side (the left side in FIG. 11) of the rotation shaft 11 is referred to as the "load side", and the opposite side thereto (the right side in FIG. 11) is referred to as the "counter-load side".

A board 7 is disposed on the counter-load side of the stator 5. A magnetic sensor 71 and a drive circuit 72 for driving the motor 1 are mounted on the board 7. The magnetic sensor 71 is disposed to face a sensor magnet 26 attached to the rotor 2. It is also possible to provide the drive circuit 72 outside the motor 1 instead of on the board 7.

Lead wires 73 are wired on the board 7. The lead wires 73 include power source lead wires for supplying power to the coil 55 of the stator 5 and sensor lead wires for transmitting a signal from the magnetic sensor 71 to the outside. A lead wire outlet part 74 for drawing out the lead wire 73 to the outside is attached to an outer circumferential portion of the mold resin portion 60.

The resin portion 4 described above is provided on the inner circumferential side of the rotor core 20 but covers both end surfaces of the rotor core 20 in the axial direction. A part of the resin portion 4 is desirably inserted into the magnet insertion hole 21. Thus, the permanent magnet 25 can be prevented from falling out of the magnet insertion hole 21.

The sensor magnet (i.e., position detecting magnets) 26 having an annular shape is attached to the rotor core 20. The sensor magnet 26 is disposed on the side of the rotor core 20 that faces the board 7 in the axial direction and is held so that the sensor magnet 26 is surrounded by the resin portion 4. The sensor magnets 26 has magnetic poles the number of which is the same as the number of poles of the rotor 2, and the magnetic poles are arranged at equal intervals in the circumferential direction. The magnetization direction of the sensor magnet 26 is the axial direction but is not limited thereto.

The magnetic sensor 71 is constituted by, for example, a Hall IC and disposed to face the sensor magnet 26 of the rotor 2. The magnetic sensor 71 detects a position (i.e., a rotational position) of the rotor 2 in the circumferential direction based on a change in the magnetic flux (N/S) from the sensor magnet 26 and outputs a detection signal. The magnetic sensor 71 is not limited to the Hall IC and may be a Magneto-Resistive (MR) element, a Giant-Magneto-Resistive (GMR) element, or a magnetic impedance element.

The detection signal of the magnetic sensor 71 is output to the drive circuit 72. In the case where the drive circuit 72 is disposed outside the motor 1, the detection signal of the magnetic sensor 71 is output to the drive circuit 72 via the sensor lead wire. The drive circuit 72 controls the current applied to the coil 55 according to the rotational position of the rotor 2 relative to the stator 5, based on the detection signal from the magnetic sensor 71.

An example in which the rotational position of the rotor 2 is detected using the sensor magnet 26 and the magnetic sensor 71 has been described, but it is also possible to perform sensorless control in which the rotational position of the rotor 2 is estimated based on the current flowing through the coil 55 or the like.

Moreover, a configuration in which the stator 5 is covered with the mold resin portion 60 has been described, but it is also possible to employ a configuration in which the stator 5 is fixed by shrink-fitting into the inside of a shell.

(Effects of Embodiment)

As described above, the rotor 2 of the first embodiment includes the magnet magnetic pole P1 (i.e., the first magnetic pole) constituted by the permanent magnet 25 and the pseudo-magnetic pole P2 (i.e., the second magnetic pole) constituted by the rotor core 20. The rotor 2 has the plurality of slits 81 and 82 in the pseudo-magnetic pole P2. The slits 81 and 82 are symmetrically formed with respect to the magnetic pole center line CL of the pseudo-magnetic pole P2. The distance L1 from the first slit 81 to the outer circumferential portion 20a of the rotor core 20 and the distance L2 from the second slit 82 to the outer circumferential portion 20a of the rotor core 20 satisfy L1<L2. With this configuration, the magnetic flux flowing from the region close to the inter-pole portion M toward the pole center of the pseudo-magnetic pole P2 can be increased.

As a result, it is possible to cause the surface magnetic flux distribution of the rotor 2 to approach the sinusoidal wave in which the magnetic flux is concentrated on the pole center and decreases toward the inter-pole portion M. Thus, a spatial harmonic of the surface magnetic flux of the rotor 2 is suppressed, and the torque ripple can be reduced. In other words, noise of the motor 1 can be reduced. Since the magnetic flux interlinking with the coil 55 of the stator 5 increases, the reduction in the output of the motor 1 due to the provision of the slits 81 and 82 can be suppressed.

Since the two first slits 81 are provided on both sides of the magnetic pole center line CL, the magnetic flux can be guided toward the pole center of the pseudo-magnetic pole P2 via the thin-wall portion 83 between the two first slits 81.

The interval W1 between the two first slits 81 in the circumferential direction (i.e., the width of the thin-wall portion 83) and the interval W3 between the second slit 82 and the magnet insertion hole 21 in the circumferential direction (i.e., the width of the core region 85) satisfy $1 \leq W3/W1 \leq 2$. Thus, the magnetic flux flowing through the region close to the inter-pole portion M is blocked as little as possible, and thus the reduction in the output of the motor 1 can be suppressed.

The interval W1 between the two first slits 81 in the circumferential direction (i.e., the width of the thin-wall portion 83), the interval W2 between the slits 81 and 82 in the circumferential direction (i.e., the width of the thin-wall portion 84), and the interval W3 between the second slit 82 and the magnet insertion hole 21 in the circumferential direction (i.e., the width of the core region 85) satisfy W1+W2≤W3. Thus, the magnetic flux is more likely to flow to the pole center of the pseudo-magnetic pole P2 through the core region 85. Thus, it is possible to enhance the effect of causing the surface magnetic flux distribution of the rotor 2 to approach the sinusoidal wave, and to suppress the reduction in the output of the motor 1.

The interval W1 between the two first slits 81 in the circumferential direction (i.e., the width of the thin-wall portion 83), the interval W2 between the slits 81 and 82 in the circumferential direction (i.e., the width of the thin-wall portion 84), and the distance L2 from the second slit 82 to the outer circumferential portion 20a of the rotor core 20 satisfy W1+W2≤L2. Thus, the magnetic path reaching the pole center of the pseudo-magnetic pole P2 through the core region 85 and through the magnetic path S of the second slit 82 on the outer circumferential side of the second slit 82 is widened, and the magnetic resistance thereof is reduced. Thus, it is possible to enhance the effect of causing the surface magnetic flux distribution of the rotor 2 to approach the sinusoidal wave, and to suppress the reduction in the output of the motor 1.

The interval W2 between the slits 81 and 82 in the circumferential direction (i.e., the width of the thin-wall portion 84) and the interval W3 between the second slit 82 and the magnet insertion hole 21 in the circumferential direction (i.e., the width of the core region 85) satisfy 1≤W3/W2≤2.2. Thus, the magnetic flux flowing through the region close to the inter-pole portion M is blocked as little as possible, and thus the reduction in the output of the motor 1 can be suppressed.

Since the length T1 of the thin-wall portion 84 between the slits 81 and 82 in the radial direction and the width H2 of the second slit 82 in the circumferential direction satisfy T1>H2, the magnetic flux flows more through the magnetic path S on the outer side of the second slit 82 in the radial direction than through the thin-wall portion 84. Thus, it is possible to enhance the effect of causing the surface magnetic flux distribution of the rotor 2 to approach the sinusoidal wave, and to suppress the reduction in the output of the motor 1.

Since the minimum distance D1 from the center axis C1 to the magnet insertion hole 21 is longer than the minimum distance D2 from the center axis C1 to the second slit 82, the magnetic flux flowing through the core region 85 can be increased. Thus, the magnetic flux flowing from the magnetic path S on the outer side of the second slit 82 in the radial direction to the pole center of the pseudo-magnetic pole P2 increases. As a result, it is possible to enhance the effect of causing the surface magnetic flux distribution of the rotor 2 to approach the sinusoidal wave, and to suppress the reduction in the output of the motor 1.

Since the resin portion 4 formed of non-magnetic material is provided between the rotation shaft 11 and the rotor core 20, it is possible to suppress the leakage of the magnetic flux from the rotor core 20 to the rotation shaft 11. Although the resin portion 4 is provided between the rotor core 20 and the rotation shaft 11 in this example, it is also possible to fix the rotation shaft 11 to a center hole of the rotor core 20 without providing the resin portion 4.

Second Embodiment

Next, a second embodiment of the present invention will be described. A motor of the second embodiment differs from the motor 1 of the first embodiment in the configuration of a rotor 2A. A stator of the motor of the second embodiment has a configuration similar to that of the stator 5 of the motor 1 of the first embodiment.

(Configuration of Rotor)

FIG. 12 is a cross-sectional view illustrating the rotor 2A of the second embodiment. The rotor 2A has a rotor core 200 having a cylindrical shape about the center axis C1. The rotor core 200 is formed of magnetic stack elements each having a thickness of for example, 0.2 to 0.5 mm which are stacked in the axial direction and fixed together by crimping or the like. The stack element in this example is an electromagnetic steel sheet that contains iron as a main component. The rotor core 200 may be formed of a resin core that contains a combination of a soft magnetic material and a resin. The diameter of the rotor 2A is 50 mm in this example.

A plurality of magnet insertion holes 21 are formed along an outer circumference of the rotor core 200. The number of magnet insertion holes 21 is five in this example. A permanent magnet 25 is disposed in each magnet insertion hole 21. The shape and arrangement of the magnet insertion hole 21 are as described in the first embodiment. The material and shape of the permanent magnet 25 are as described in the first embodiment.

A magnet magnetic pole P1 is formed by the permanent magnet 25 disposed in each magnet insertion hole 21. A pseudo-magnetic pole P2 having an opposite polarity to that of the permanent magnet 25 is formed between adjacent permanent magnets 25 in the rotor core 200. That is, the rotor 2A has five magnet magnetic poles P1 and five pseudo-magnetic poles P2 which are alternately arranged in the circumferential direction. Thus, the number of poles of the rotor 2A is ten. The number of poles of the rotor 2A is not limited to ten.

The rotor core 200 has a center hole 28 at a center thereof in the radial direction, and the rotation shaft 11 is fixed to the center hole 28. That is, the rotor 2A of the second embodiment does not have the resin portion 4 (FIG. 1) described in the first embodiment. The material and shape of the rotation shaft 11 are as described in the first embodiment. An air hole 27 is provided on the inner side in the radial direction with respect to the magnet insertion hole 21 in the rotor core 200 as illustrated in FIG. 12, but it is also possible to provide no air hole 27.

The outer circumference of the rotor core 200 has a flower shape as described in the first embodiment. That is, the outer circumference of the rotor core 200 has outer circumferential portions 20a whose centers are located at the pole centers of the magnetic poles (the magnet poles P1 or pseudo-magnetic poles P2), and outer circumferential portions 20b whose centers are located at the inter-pole portions M. Both of the outer circumferential portions 20a and 20b are arc-shaped portions and have the centers of curvature on the center axis C1 side, but the outer circumferential portions 20a and 20b have different radii of curvature.

The flux barrier 22 described in the first embodiment is provided on each of both sides of the magnet insertion hole 21 in the circumferential direction. The flux barrier 22 in this example is disposed on each of both ends of the magnet insertion hole 21 in the circumferential direction but may be disposed only on one end of the magnet insertion hole 21 in the circumferential direction.

FIG. 13 is an enlarged diagram illustrating a portion including the pseudo-magnetic pole P2 of the rotor 2A. The rotor core 200 has a slit group 8 including a plurality of slits 81 and 82 in each pseudo-magnetic pole P2. In the second embodiment, the slit group 8 has one first slit 81 located on the magnetic pole center line CL of the pseudo-magnetic pole P2 and two second slits 82 formed on both sides of the first slit 81 in the circumferential direction.

The first slit 81 is formed symmetrically with respect to the magnetic pole center line CL of the pseudo-magnetic pole P2, and the second slits 82 are formed symmetrically with respect to the magnetic pole center line CL of the pseudo-magnetic pole P2. More specifically, the first slit 81 is formed such that its center in the circumferential direction is located on the magnetic pole center line CL, and the first slit 81 has a symmetric shape with respect to the magnetic pole center line CL. The two second slits 82 are formed at symmetrical positions and have symmetrical shapes with respect to the magnetic pole center line CL.

The first slit 81 has a shape elongated in the radial direction. More specifically, the first slit 81 has an end portion 81a on an outer side in the radial direction, an end portion 81b on an inner side in the radial direction, and end portions 81c and 81d on both sides in the circumferential direction.

The end portions 81a and 81b of the first slit 81 extend perpendicularly to the magnetic pole center line CL. The end portions 81c and 81d extend in parallel to the magnetic pole center line CL. A length A1 of the first slit 81 (i.e., an interval between the end portions 81a and 81b) is longer than a width H1 of the first slit 81 (i.e., an interval between the end portions 81c and 81d).

The second slit 82 has a shape elongated in the radial direction. More specifically, the second slit 82 has an end portion 82a on an outer side in the radial direction, an end portion 82b on an inner side in the radial direction, an end portion 82c on an outer side in the circumferential direction (i.e., on a side far from the magnetic pole center line CL), and an end portion 82d on an inner side in the circumferential direction (i.e., on a side close to the magnetic pole center line CL).

The end portion 82a of the second slit 82 extends along the outer circumferential portion 20a, and the end portion 82b extends perpendicularly to the magnetic pole center line CL. The end portions 82c and 82d extend in parallel to the magnetic pole center line CL. A length A2 of the second slit 82 (i.e., an interval between the end portions 82a and 82b) is longer than a width H2 of the second slit 82 (i.e., an interval between the end portions 82c and 82d).

The length A1 of the first slit 81 is shorter than the length A2 of the second slit 82. The width H1 of the first slit 81 is shorter than the width H2 of the second slit 82. That is, a cross-sectional area of the first slit 81 is smaller than a cross-sectional area of the second slit 82.

A thin-wall portion 84 is formed between the first slit 81 and the second slit 82. The thin-wall portion 84 has a minimum width W2 in the circumferential direction (i.e., a minimum interval between the end portion 81c of the first slit 81 and the end portion 82d of the second slit 82). The width W2 of the thin-wall portion 84 is constant along the radial direction in FIG. 13 but is not necessarily constant.

A core region 85 is formed between the second slit 82 and the flux barrier 22. The core region 85 has a width W3 between the second slit 82 and an end of the flux barrier 22 closest to the magnetic pole center line CL. The width W3 is the minimum width of the core region 85 in the circumferential direction.

A distance L1 is defined as the minimum distance between the first slit 81 and the outer circumferential portion 20a (i.e., the minimum distance between the end portion 81a of the first slit 81 and the outer circumferential portion). A distance L2 is defined as the minimum distance between the second slit 82 and the outer circumferential portion 20a (i.e., the minimum distance between the end portion 82a of the second slit 82 and the outer circumferential portion 20a). The distances L1 and L2 satisfy the relationship of L1<L2.

(Action)

Next, the action of the second embodiment will be described. With a configuration in which the gap between the rotor 2A and the stator 5 is minimum at the pole center of each of the magnetic poles (the magnet magnetic poles P1 and the pseudo-magnetic poles P2) and increases as a distance from the pole center increase as described in the first embodiment, the magnetic flux is concentrated on the pole center. Thus, the surface magnetic flux distribution of the rotor 2A approaches the sinusoidal wave.

In the rotor 2A, a degree of freedom of the magnetic flux flowing through the pseudo-magnetic pole P2 is high, and thus the surface magnetic flux of the rotor 2A significantly changes depending on the rotational position of the rotor 2A relative to the stator 5. Thus, by providing the slits 81 and 82 in the rotor 2A to restrict the degree of freedom of the magnetic flux, the effect of causing the surface magnetic flux distribution of the rotor 2A to approach the sinusoidal wave can be enhanced.

In particular, since the distance L2 from the second slit 82 to the outer circumferential portion 20a is longer than the distance L1 from the first slit 81 to the outer circumferential portion 20a, the magnetic flux flowing from the region close to the inter-pole portion M toward the pole center of the pseudo-magnetic pole P2 can be increased. Thus, the surface magnetic flux distribution of the rotor 2A approaches the sinusoidal wave, and a spatial harmonic can be suppressed. Thus, the torque ripple can be suppressed, and noise of the motor 1 is reduced.

Since the magnetic flux flowing from the region close to the inter-pole portion M toward the pole center of the pseudo-magnetic pole P2 increases, the magnetic flux inter-linking with the coil 55 (FIG. 1) of the stator 5 increases, and thus the reduction in the output of the motor 1 can be suppressed. That is, noise of the motor 1 can be reduced and the reduction in the output of the motor can be suppressed.

Next, the dimensions of the thin-wall portion 84 and the core region 85 will be described. As described above, the thin-wall portion 84 between the first slit 81 and the second slit 82 has the width W2. The core region 85 between the second slit 82 and the flux barrier 22 has the width W3.

As described in the first embodiment, when W3/W2 is in the range of 1≤W3/W2≤2.2, the surface magnetic flux of the rotor 2A becomes especially high. That is, since the width W3 of the core region 85 is greater than or equal to the width W2 of the thin-wall portion 84, the magnetic flux flowing through the region close to the inter-pole portion M is blocked as little as possible. Further, since the width W2 of the thin-wall portion 84 is not extremely narrow, an increase in the magnetic resistance of the thin-wall portion 84 can be suppressed.

In addition, the distance L2 between the second slit 82 and the outer circumferential portion 20a of the rotor 2A is desirably greater than or equal to the width W2 of the thin-wall portion 84 (i.e., W2≤L2 is satisfied). With this configuration, the magnetic path from the core region 85 toward the pole center of the pseudo-magnetic pole P2 via the magnetic path S on the outer circumferential side of the second slit 82 is wider than the magnetic path toward the pole center of the pseudo-magnetic pole P2 via the thin-wall portion 84, and thus the magnetic resistance is reduced. Thus, it is possible to enhance the effect of causing the surface magnetic flux distribution of the rotor 2A to approach the sinusoidal wave, and to suppress the reduction in the magnetic force.

A length T1 is defined as the length of the thin-wall portion 84 between the first slit 81 and the second slit 82 in the radial direction. The length T1 is desirably greater than the width H2 of the second slit 82 in the circumferential direction (i.e., T1>H2 is satisfied).

As described in the first embodiment, when both the thin-wall portion 84 and the magnetic path S on the outer side of the second slit 82 in the radial direction reach the magnetic saturation state, the magnetic flux flows through the shorter one of the magnetic paths in which the magnetic saturation occurs. Thus, when the length T1 of the thin-wall portion 84 is longer than the width H2 of the second slit 82, the magnetic flux flows more through the magnetic path S on the outer side of the second slit 82 in the radial direction than through the thin-wall portion 84. Therefore, the magnetic flux flowing through the region close to the inter-pole portion M can be guided toward the pole center of the pseudo-magnetic pole P2 through the magnetic path S on the outer side of the second slit 82 in the radial direction. As a result, the effect of causing the surface magnetic flux distribution of the rotor 2A to approach the sinusoidal wave can be enhanced, and the reduction in the magnetic force can be suppressed.

The minimum distance D1 from the center axis C1 of the rotor 2A to the magnet insertion hole 21 is desirably longer than the minimum distance D2 from the center axis C1 to the second slit 82 (i.e., D1>D2 is satisfied). The magnetic flux emitted from the permanent magnet 25 and flowing into the thin-wall portion 84 is reduced. This is because the second slit 82 is present on the magnetic path connecting the permanent magnet 25 and the thin-wall portion 84 by the shortest distance, and the second slit 82 serves as a magnetic barrier.

The magnetic flux flowing through the core region 85 increases as the magnetic flux flowing into the thin-wall portion 84 decreases. This results in an increase in the magnetic flux flowing toward the pole center of the pseudo-magnetic pole P2 through the magnetic path S on the outer side of the second slit 82 in the radial direction. Thus, it is possible to enhance the effect of causing the surface magnetic flux distribution of the rotor 2A to approach the sinusoidal wave, and to suppress the reduction in the magnetic force.

(Effects of Embodiment)

As described above, in the second embodiment, there are three slits 81 and 82 in the rotor 2A, and the first slit 81 is located on the magnetic pole center line CL. As in the first embodiment, the distance L1 from the first slit 81 to the outer circumferential portion 20a of the rotor core 200 and the distance L2 from the second slit 82 to the outer circumferential portion 20a of the rotor core 200 satisfy L1<L2. Thus, the magnetic flux flowing toward the pole center of the pseudo-magnetic pole P2 from the region close to the inter-pole portion M can be increased.

Thus, it is possible to cause the surface magnetic flux distribution of the rotor 2A to approach the sinusoidal wave. Consequently, a spatial harmonic of the surface magnetic flux of the rotor 2A is suppressed, so that the torque ripple can be reduced. In other words, noise of the motor 1 can be reduced. Since the magnetic flux interlinking with the coil 55 of the stator 5 increases, the reduction in the magnetic force due to the provision of the slits 81 and 82 can be suppressed.

A configuration in which the rotation shaft 11 is fixed to the center hole 28 of the rotor core 200 of the rotor 2A has been described, but the resin portion 4 (FIG. 1) may be provided between the rotor core 200 and the rotation shaft 11 as described in the first embodiment.

Although the pseudo-magnetic pole P2 is provided with the four slits in the first embodiment and the three slits in the second embodiment, the pseudo-magnetic pole P2 may be provided with five or more slits.

(Air Conditioner)

Figure 14A:
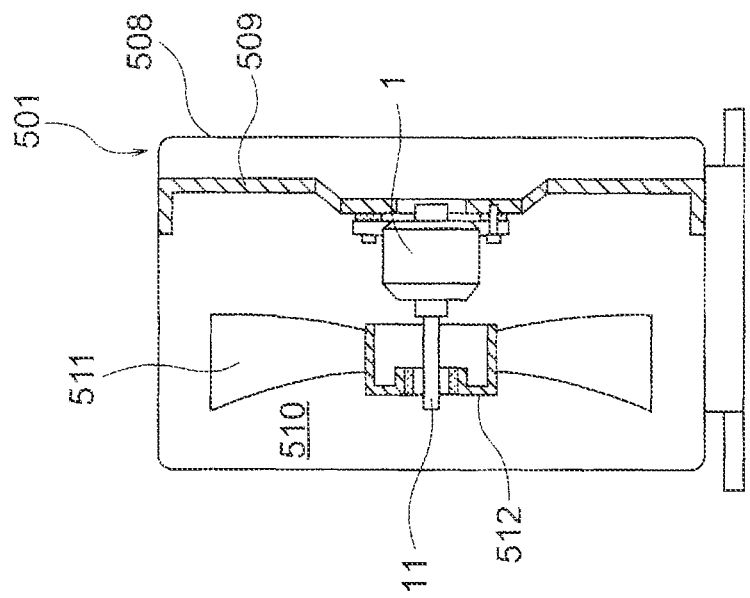
FIG. 14(A) is a front view illustrating an air conditioner to which the motor of each embodiment is applicable.

Next, an air conditioner to which the motor of each of the above-described embodiments is applicable will be described. FIG. 14(A) is a diagram illustrating a configuration of an air conditioner 500 to which the motor of each embodiment is applicable. The air conditioner 500 includes an outdoor unit 501, an indoor unit 502, and a refrigerant pipe 503 connecting these units. The outdoor unit 501 has a fan (an outdoor fan) 510.

Figure 14B:
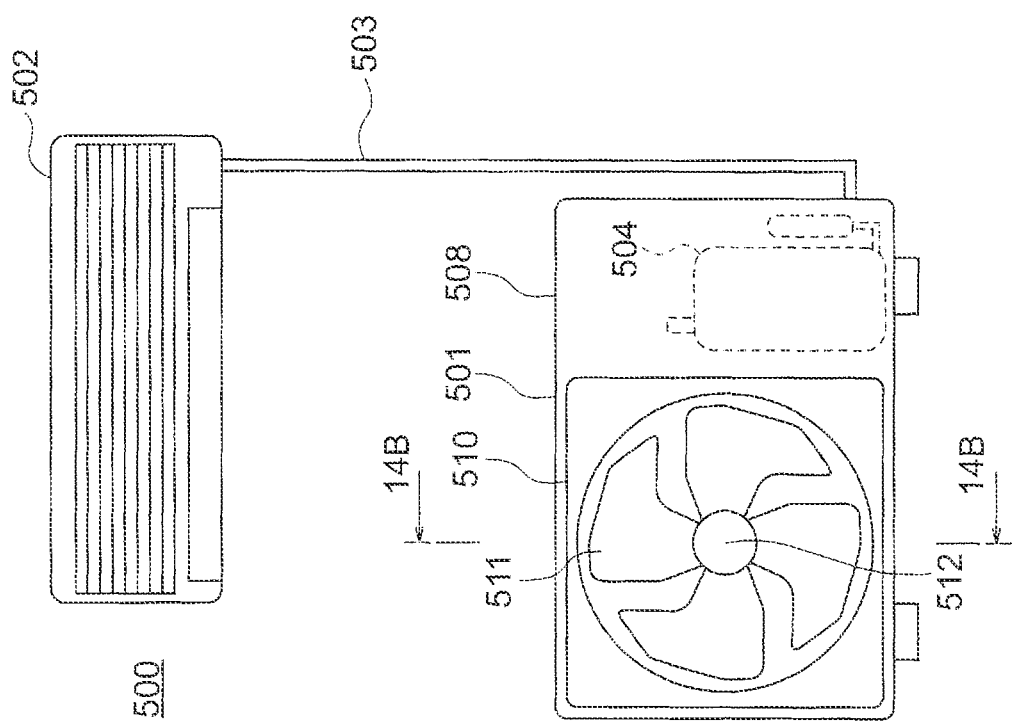
FIG. 14(B) is a cross-sectional view illustrating an outdoor unit of the air conditioner.

FIG. 14(B) is a cross-sectional view taken along the line 14B-14B illustrated in FIG. 14(A). The outdoor unit 501 has a housing 508 and a frame 509 fixed in the housing 508. The motor 1 serving as a drive source of the fan 510 is fixed to the frame 509. An impeller (blade portion) 511 is attached to the rotation shaft 11 of the motor 1 via a hub 512.

Figure 15:
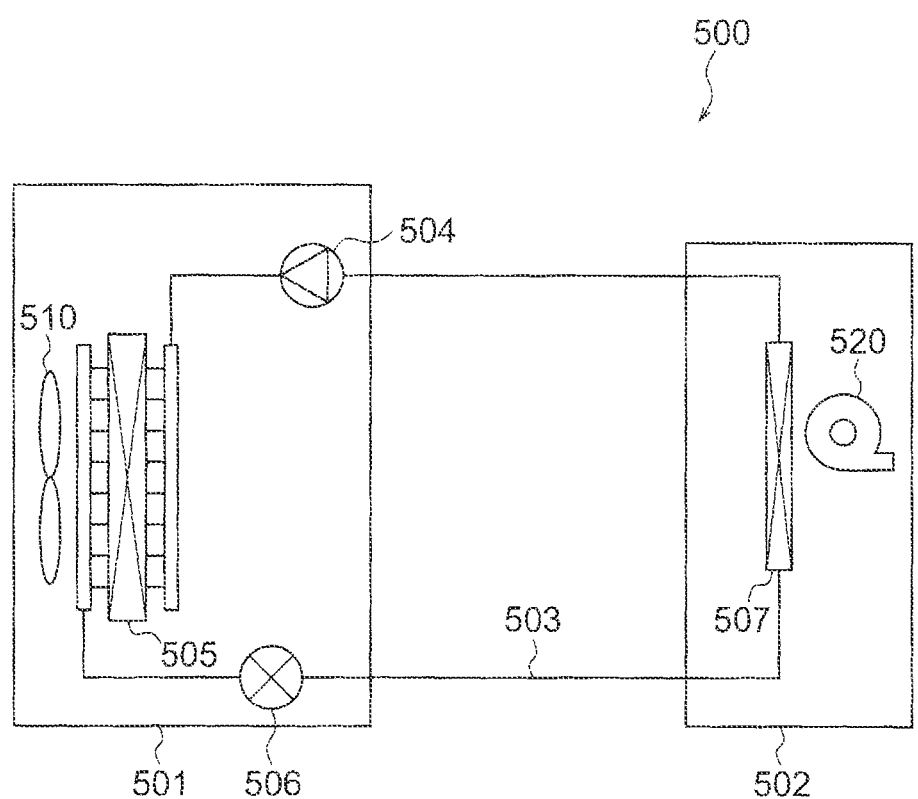
FIG. 15 is a schematic diagram illustrating a refrigerant circuit of the air conditioner illustrated in FIG. 14(A).

FIG. 15 is a schematic diagram illustrating a refrigerant circuit in the air conditioner 500. The air conditioner 500 includes a compressor 504, a condenser 505, a throttle device (a decompression device) 506, and an evaporator 507. The compressor 504, the condenser 505, the throttle device 506, and the evaporator 507 are connected together by the refrigerant pipe 503 to constitute a refrigeration cycle. That is, refrigerant circulates through the compressor 504, the condenser 505, the throttle device 506, and the evaporator 507 in this order.

The compressor 504, the condenser 505, and the throttle device 506 are provided in the outdoor unit 501. The evaporator 507 is provided in the indoor unit 502. A fan (an indoor fan) 520 that supplies indoor air to the evaporator 507 is provided in the indoor unit 502.

The operation of the air conditioner 500 is as follows. The compressor 504 compresses sucked refrigerant and sends out the compressed refrigerant. The condenser 505 exchanges heat between the refrigerant flowing in from the compressor 504 and the outdoor air to condense and liquefy the refrigerant and sends out the liquefied refrigerant to the refrigerant pipe 503. The fan 510 of the outdoor unit 501 releases the heat dissipated when the refrigerant is condensed in the condenser 505, to the outside of a room. The throttle device 506 adjusts the pressure or the like of the refrigerant flowing through the refrigerant pipe 503.

The evaporator 507 exchanges heat between the refrigerant brought into a low-pressure state by the throttle device 506 and the indoor air to cause the refrigerant to take heat from the indoor air and evaporate (vaporize), and then sends out the evaporated refrigerant to the refrigerant pipe 503. The fan 520 of the indoor unit 502 supplies the indoor air to the evaporator 507. Thus, cooled air deprived of heat at the evaporator 507 is supplied to the interior of the room.

The motor 1 of each of the above-described embodiments is configured to suppress demagnetization of the permanent magnets 25. Thus, by using the motor 1 as the power source of the fan 510, the operation efficiency of the air conditioner 500 can be enhanced for a long time, and energy consumption can be reduced.

Although the motor 1 of each embodiment is used as the drive source of the fan 510 (i.e., the outdoor fan) in this example, the motor 1 of each embodiment may be used as a drive source of a fan 520 (i.e., the indoor fan). The motor 1 of each embodiment is not limited to the drive source for the fan and may be used as, for example, a drive source for the compressor 504.

The motor 1 of each embodiment is not limited to the motor for the air conditioner 500 and may be used as motors for ventilation fans, home appliances or machine tools, for example.

Although the desirable embodiments of the present invention have been described in detail, the present invention is not limited to the above-described embodiments, and various modifications or changes can be made without departing from the scope of the present invention.

What is claimed is:

1. A rotor comprising:
a rotor core having an outer circumference of an annular shape surrounding a center axis and a magnet insertion hole formed along the outer circumference; and
a permanent magnet disposed in the magnet insertion hole,
wherein the permanent magnet constitutes a first magnetic pole, and a part of the rotor core constitutes a second magnetic pole;
wherein the rotor core has a plurality of slits in the second magnetic pole;
wherein the plurality of slits are symmetrically formed with respect to a magnetic pole center line connecting a pole center of the second magnetic pole and the center axis;
wherein, on one side of the magnetic pole center line in a circumferential direction about the center axis, the plurality of slits have a first slit closest to the magnetic pole center line and a second slit adjacent to the first slit in the circumferential direction, and a magnetic path is formed between the second slit and the outer circumference of the rotor core;
wherein the first slit and the second slit are adjacent to each other in the circumferential direction and face the outer circumference of the rotor core,
wherein a minimum distance L1 from the first slit to the outer circumference of the rotor core and a minimum distance L2 from the second slit to the outer circumference of the rotor core satisfy $L1<L2$,
wherein the plurality of slits have another first slit formed symmetrically to the first slit with respect to the magnetic pole center line, on the other side of the magnetic pole center line in the circumferential direction, and
wherein an interval W1 between the first slit and the another first slit in the circumferential direction and an interval W3 between the second slit and the magnet insertion hole in the circumferential direction satisfy $1 \leq W3/W1 \leq 2.1$.

2. The rotor according to claim 1, wherein the first slit is formed on the magnetic pole center line.

3. The rotor according to claim 1, wherein the interval W1 between the first slit and the another first slit in the circumferential direction, an interval W2 between the first slit and the second slit in the circumferential direction, and an interval W3 between the second slit and the magnet insertion hole in the circumferential direction satisfy $W1+W2 \leq W3$.

4. A rotor comprising:
a rotor core having an outer circumference of an annular shape surrounding a center axis and a magnet insertion hole formed along the outer circumference; and
a permanent magnet disposed in the magnet insertion hole,
wherein the permanent magnet constitutes a first magnetic pole, and a part of the rotor core constitutes a second magnetic pole;
wherein the rotor core has a plurality of slits in the second magnetic pole;
wherein the plurality of slits are symmetrically formed with respect to a magnetic pole center line connecting a pole center of the second magnetic pole and the center axis;
wherein, on one side of the magnetic pole center line in a circumferential direction about the center axis, the plurality of slits have a first slit closest to the magnetic pole center line and a second slit adjacent to the first slit in the circumferential direction, and a magnetic path is formed between the second slit and the outer circumference of the rotor core;
wherein the first slit and the second slit are adjacent to each other in the circumferential direction and face the outer circumference of the rotor core,
wherein a minimum distance L1 from the first slit to the outer circumference of the rotor core and a minimum distance L2 from the second slit to the outer circumference of the rotor core satisfy $L1 \leq L2$,
wherein the plurality of slits have another first slit formed symmetrically to the first slit with respect to the magnetic pole center line, on the other side of the magnetic pole center line in the circumferential direction,
wherein an interval W1 between the first slit and the another first slit in the circumferential direction, an interval W2 between the first slit and the second slit in the circumferential direction, and an interval W3 between the second slit and the magnet insertion hole in the circumferential direction satisfy $W1+W2 \leq W3$, and
wherein the interval W1, the interval W2, and the minimum distance L2 satisfy $W1+W2 \leq L2$.

5. A rotor comprising:
a rotor core having an outer circumference of an annular shape surrounding a center axis and a magnet insertion hole formed along the outer circumference; and
a permanent magnet disposed in the magnet insertion hole,
wherein the permanent magnet constitutes a first magnetic pole, and a part of the rotor core constitutes a second magnetic pole;
wherein the rotor core has a plurality of slits in the second magnetic pole;
wherein the plurality of slits are symmetrically formed with respect to a magnetic pole center line connecting a pole center of the second magnetic pole and the center axis;
wherein, on one side of the magnetic pole center line in a circumferential direction about the center axis, the plurality of slits have a first slit closest to the magnetic pole center line and a second slit adjacent to the first slit in the circumferential direction, and a magnetic path is formed between the second slit and the outer circumference of the rotor core;
wherein the first slit and the second slit are adjacent to each other in the circumferential direction and face the outer circumference of the rotor core;

wherein a minimum distance L1 from the first slit to the outer circumference of the rotor core and a minimum distance L2 from the second slit to the outer circumference of the rotor core satisfy L1<L2, wherein an interval W2 between the first slit and the second slit in the circumferential direction, and an interval W3 between the second slit and the magnet insertion hole in the circumferential direction satisfy 1≤W3/W2≤2.2.

6. The rotor according to claim 1, wherein the rotor core has a thin-wall portion between the first slit and the second slit, and wherein a length T1 of the thin-wall portion in a radial direction about the center axis and a width H2 of the second slit in the circumferential direction satisfy T1>H2.

7. The rotor according to claim 1, wherein a minimum distance from the center axis to the magnet insertion hole is longer than a minimum distance from the center axis to the second slit.

8. The rotor according to claim 1, wherein an outer circumference of the rotor core has a first outer circumferential portion extending through a pole center of the first magnetic pole, a second outer circumferential portion extending through a pole center of the second magnetic pole, and a third outer circumferential portion formed between the first outer circumferential portion and the second outer circumferential portion, and wherein a maximum distance from the center axis to the third outer circumferential portion is shorter than a maximum distance from the center axis to the first outer circumferential portion and shorter than a maximum distance from the center axis to the second outer circumferential portion.

9. The rotor according to claim 1, further comprising:

a rotation shaft; and a supporting portion provided between the rotation shaft and the rotor core and formed of non-magnetic material.

10. A motor comprising:

the rotor according to claim 1; and a stator surrounding the rotor from an outer side in a radial direction about the center axis.

11. A fan comprising:

the motor according to claim 10; and a blade portion driven to rotate by the motor.

12. An air conditioner comprising an outdoor unit, an indoor unit, and a refrigerant pipe connecting the outdoor unit and the indoor unit, at least one of the outdoor unit and the indoor unit comprising the fan according to claim 11.

\* \* \* \* \*